United States Patent
Carlson et al.

(10) Patent No.: US 8,956,151 B2
(45) Date of Patent: Feb. 17, 2015

(54) MOLDING APPARATUS

(75) Inventors: Kurt Carlson, Reno, NV (US); Reimer Hansen, Reno, NV (US); Thilo Wilhelm, Reno, NV (US)

(73) Assignee: Moldman Machines, LLC, Germantown, WI (US)

( * ) Notice: Subject to any disclaimer, the term of this patent is extended or adjusted under 35 U.S.C. 154(b) by 224 days.

(21) Appl. No.: 13/618,768

(22) Filed: Sep. 14, 2012

(65) Prior Publication Data

US 2013/0249144 A1 Sep. 26, 2013

Related U.S. Application Data

(60) Provisional application No. 61/534,838, filed on Sep. 14, 2011, provisional application No. 61/540,989, filed on Sep. 29, 2011.

(51) Int. Cl.
*B29C 45/27* (2006.01)
*B29C 45/64* (2006.01)
*B29C 45/04* (2006.01)
*B29C 45/68* (2006.01)
*B29C 33/22* (2006.01)

(52) U.S. Cl.
CPC ............. *B29C 45/045* (2013.01); *B29C 45/68* (2013.01); *B29C 33/22* (2013.01)
USPC ........................................ 425/590; 425/451.2

(58) Field of Classification Search
USPC ................................ 425/451.2, 590
See application file for complete search history.

(56) References Cited

U.S. PATENT DOCUMENTS

| | | | |
|---|---|---|---|
| 3,025,567 A | 8/1957 | Sherman | |
| 3,156,014 A | 11/1964 | Wenger | |
| 3,604,058 A * | 9/1971 | Fischbach | 425/150 |
| 3,752,623 A | 8/1973 | Sinn et al. | |
| 5,209,889 A | 5/1993 | Brown | |
| 5,318,435 A | 6/1994 | Brown | |
| 5,375,989 A | 12/1994 | Tsutsumi | |
| 5,378,140 A * | 1/1995 | Asano et al. | 425/451.2 |
| 5,531,581 A | 7/1996 | Donnell | |
| 5,698,240 A * | 12/1997 | Haguchi | 425/451.2 |
| 5,792,493 A | 8/1998 | Gellert | |
| 5,879,726 A * | 3/1999 | Hsing | 425/451.2 |
| 5,945,139 A | 8/1999 | Price | |
| 6,060,005 A | 5/2000 | Hettinga | |
| 6,186,770 B1 * | 2/2001 | Ziv-Av | 425/590 |
| 6,235,230 B1 * | 5/2001 | Puniello | 264/278 |

(Continued)

FOREIGN PATENT DOCUMENTS

| | | |
|---|---|---|
| CA | 2252562 A1 | 10/1997 |
| CN | 1216492 A | 5/1999 |

(Continued)

*Primary Examiner* — James Mackey
(74) *Attorney, Agent, or Firm* — Reinhart Boerner Van Deuren s.c.

(57) ABSTRACT

A method and apparatus for low pressure molding are disclosed. The molding apparatus comprises a frame, a mold assembly and a transmission assembly. The mold assembly may comprise a first mold and a second mold, the second mold being coupled to the frame. The transmission assembly may be coupled to the frame and to the first mold. A motor may be coupled to the transmission assembly for moving the first mold relative to the second mold. A pneumatic actuator may also be coupled to the transmission assembly for increasing clamping pressure between the first mold and the second mold.

10 Claims, 20 Drawing Sheets

(56) References Cited

U.S. PATENT DOCUMENTS

| | | |
|---|---|---|
| 6,254,378 B1 | 7/2001 | Berghoff |
| 6,688,871 B1 | 2/2004 | Lee |
| 6,821,110 B2 | 11/2004 | Carlson |
| 6,872,066 B2 | 3/2005 | Wernz |
| 6,990,896 B2 * | 1/2006 | White et al. .................. 425/150 |
| 7,128,563 B2 * | 10/2006 | Teng et al. .................... 425/590 |
| 7,766,648 B2 * | 8/2010 | McBain et al. ............... 425/588 |
| 7,876,923 B2 | 1/2011 | Finnegan |
| 2005/0042326 A1 | 2/2005 | Teng |
| 2008/0174038 A1 * | 7/2008 | Glaesener et al. ............ 425/150 |

FOREIGN PATENT DOCUMENTS

| | | |
|---|---|---|
| DE | 69709103 T2 | 8/2002 |
| JP | 2001501550 A | 2/2001 |
| WO | 9739873 A1 | 10/1997 |

\* cited by examiner

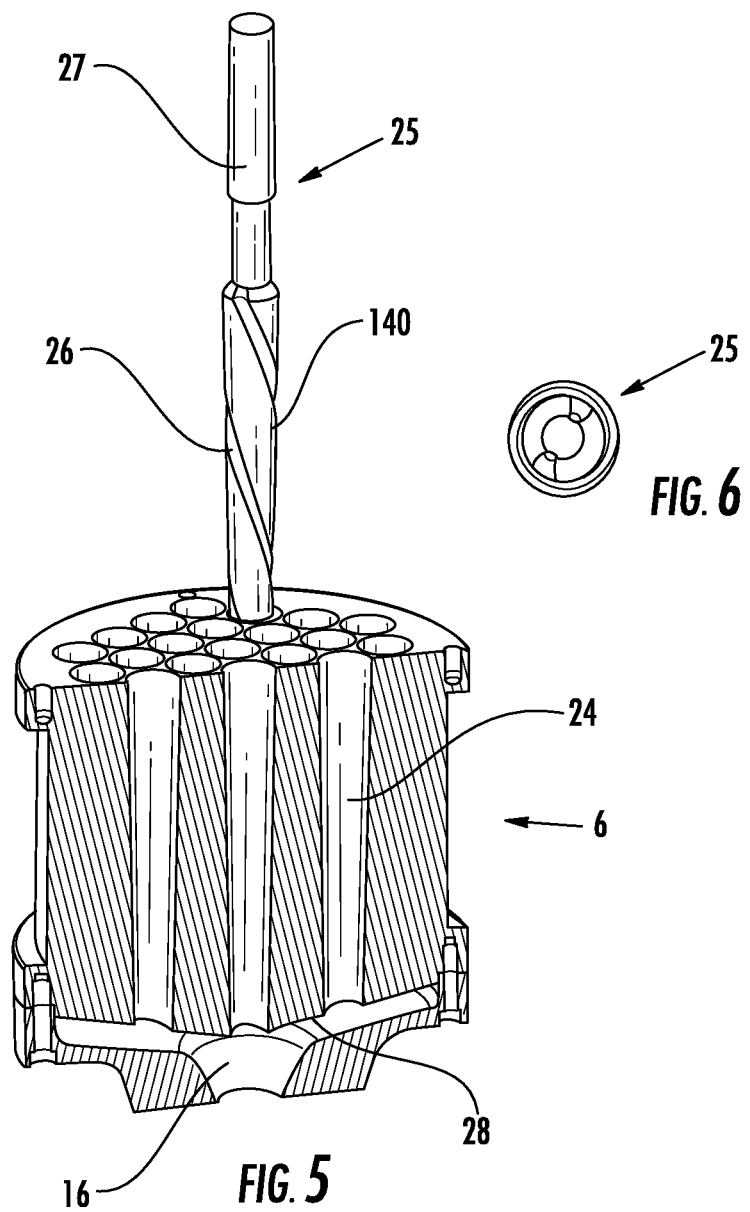

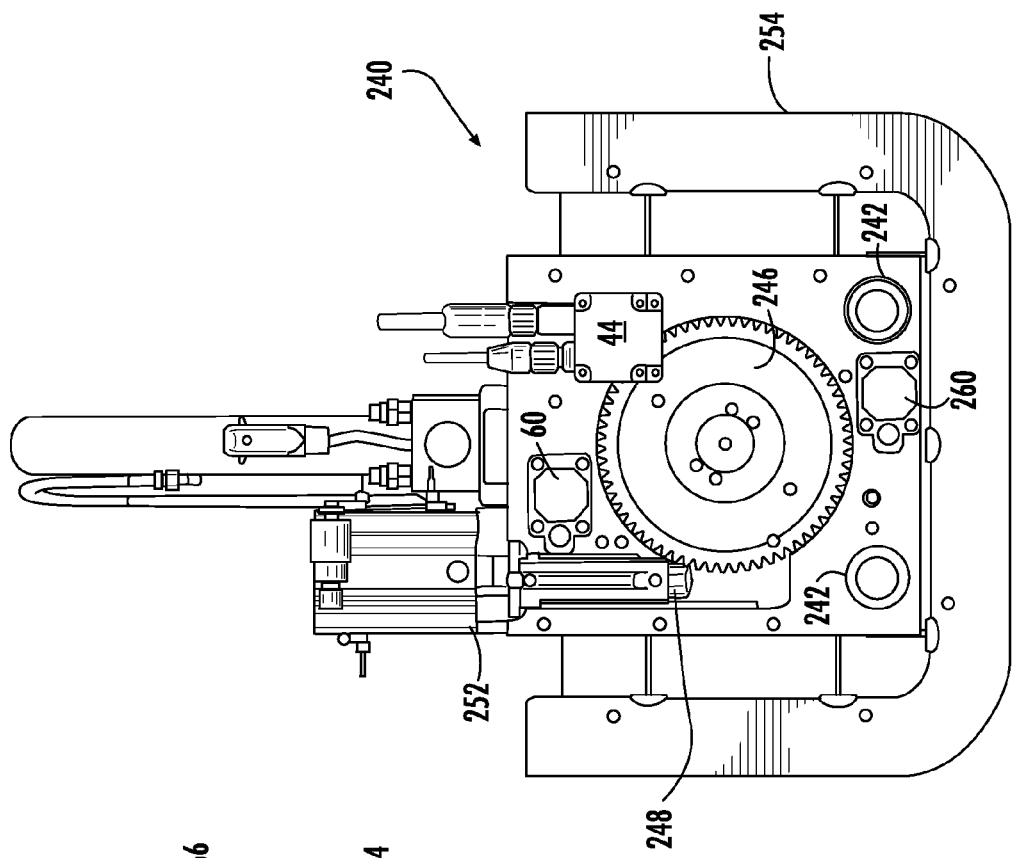
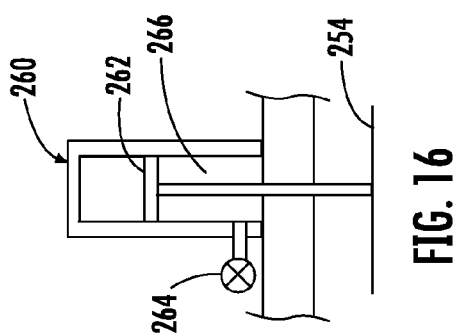
FIG. 15
FIG. 16

MOLDING APPARATUS

CROSS REFERENCE TO RELATED APPLICATIONS

This application claims priority to U.S. provisional patent application Ser. No. 61/534,838, filed 14 Sep. 2011 and to U.S. provisional patent application Ser. No. 61/540,989, filed 20 September, the contents of each of which is herein incorporated by reference.

FIELD OF THE INVENTION

The present invention relates to apparatus for low pressure molding and methods of using the same. The present invention also relates to a premelt polyamide molding apparatus, which is primarily used for insert molding. More specifically, it is directed to a molding apparatus for use with hot melt adhesives such as dimer acid based polyamide resins. Such raw materials can be used for molding at relatively low pressures, thus allowing encapsulation of fragile components.

BACKGROUND

While molding machines for insert molding using hot melt adhesives are known, these machines are typically adapted from hot melt application equipment. An example of such a system would be the OPTIMEL® 2000 (OPTIMEL is a registered trademark of Henkel) machine, available from Opti-Mel GmbH, Iserlohn, Germany. These systems have many disadvantages.

One disadvantage of machines based on hot melt adhesive application technology is that they typically use a heated hose to transport molten adhesive from a melt unit to an injection unit having an injection nozzle. The hoses must be heated or the adhesive will solidify in the hose. The use of such hoses is problematic due to the cost of replacing these hoses. In addition, the hoses often require frequent maintenance and replacement due to charring of the adhesive as it is transferred through the hose. The hoses limit both the molding materials that can be used and the temperature of the molding materials. It is typically not possible to heat the molding material to temperatures above the temperature achieved by the heated hose.

Systems using a heated hose are also disfavored because they do not allow precise control over the molding pressure. For instance, these molding machines operate around 100-1,000 psi. The molding pressure can generally only be controlled to about plus or minus 50 psi using known hot melt application based molding machines. Part of the reason for this imprecision is the large pressure loss between the pump/melt unit and the injection unit. The heated hoses used in these machines are often quite long (six feet, for example). The distance between the pump and the injection nozzle and the accompanying frictional forces require greater pump pressures to be used. This arrangement can cause a pressure differential between the pump and the injection nozzle.

High pressure injection molding is known. These systems typically are used to mold plastic materials. Examples of such machines are manufactured by Milacron Inc. of Cincinnati, Ohio. High pressure injection molding machines inject at pressures typically between 1,000 to 30,000 psi. These high pressures are unsuitable for over-molding certain components, such as electronics. In addition, many materials, including hot melt adhesives, are unsuitable for use in high pressure injection machines.

Epoxy potting has been used to encapsulate delicate components, such as electronics. However, epoxy based methods suffer from long curing times (24 hours) and large amounts of waste. Unused epoxy material will cure, rendering it useless for potting. Epoxy materials are also unsuitable for some applications because they tend to be very hard and brittle. Additionally, epoxy materials may be somewhat toxic and can be expensive.

U.S. application Ser. No. 10/202,433 (hereinafter, "the '433 application") discloses an elegant solution to many of the problems of previous injection molding machines, hot melt application based machines, and epoxy methods. The '433 application discloses the use of a molding apparatus that operates at low pressures and allows for precise pressure control. The device allows even delicate electronic components to be molded.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to mold at relatively low pressures;
more precise control over the molding pressure;
the ability to use a smaller and cheaper motor for moving a mold assembly;
reduced wear on the motor;
reduced wear on mold components;
the ability to mold a variety of different materials having a variety of physical properties;
the ability to mold intricate designs;
improved quality of molded components;
lower operating expenses;
does not require a heated hose;
easy assembly, maintenance and increased versatility of the molding apparatus; and
reduced cycle time, resulting in greater machine throughput.

These and other advantages may be realized by reference to the remaining portions of the specification, claims, and abstract.

Brief Description of One Embodiment of the Present Invention

In one embodiment, the present invention is an apparatus for molding with hot melt adhesives that includes an injection unit moveably attached to a frame. The injection unit preferably includes a melt reservoir configured to melt and store hot melt adhesive. The apparatus also preferably includes a pump for pumping molten hot melt adhesive from the melt reservoir through an injection nozzle and into a mold.

In another embodiment, the present invention relates to methods of low pressure molding. The method preferably involves melting hot melt adhesive in a melt reservoir. A mold injection unit is preferably lowered into engagement with a mold set. Molten hot melt adhesive is then pumped from the melt reservoir and injected into the mold through an injection nozzle.

In another embodiment, the present invention provides a molding apparatus comprising a frame, a mold assembly and a transmission assembly. The mold assembly may comprise a first mold and a second mold, the second mold being coupled to the frame. The transmission assembly may be coupled to the frame and to the first mold. A motor may be coupled to the transmission assembly for moving the first mold relative to the second mold. A pneumatic actuator may also be coupled to the transmission assembly for increasing clamping pressure between the first mold and the second mold.

In another embodiment, the invention provides a method for molding using a mold apparatus comprising a first mold and a second mold, the first mold being moveable relative to the second mold. The method may comprise operating a motor to bring the first and second mold into and out of interface engagement with each other and operating a pneumatic actuator to apply clamping pressure between the first mold and the second mold.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 5 is substantially a cross sectional view of one embodiment of a melt reservoir for a molding apparatus of the present invention.

FIG. 6 is substantially a bottom view of one embodiment of a melt reservoir cleaning device for a molding apparatus of the present invention.

FIG. 15 is substantially a top plan view of one embodiment of the clamping apparatus of the present invention.

FIG. 16 is substantially a schematic view of a piston of the present invention.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The present invention relates to apparatus and methods for molding. The methods and apparatus disclosed herein may find use in many industries and applications such as automotive manufacturing, wire harnesses, sensor manufacturing, and white goods. Examples of items that may be molded using the methods and apparatus of the present invention include, but are not limited to: encapsulation and environmental protection of electronic components; PCB encapsulation; molding of strain relief on connectors, cables, and wires; molding of grommets onto cables; vibration protection; providing flexibility and protection for electronics during temperature cycle testing.

Frame and Injection Unit

Figure 1:
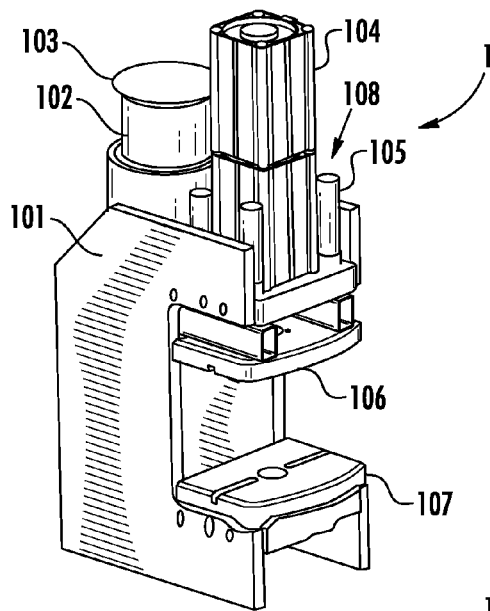
FIG. 1 is substantially a perspective view of one embodiment of the molding apparatus of the present invention.
Figure 2:
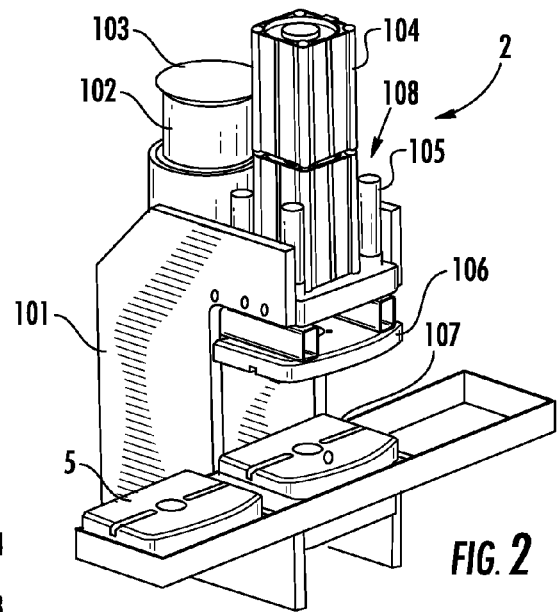
FIG. 2 is substantially a perspective view of one embodiment of the molding apparatus of the present invention having a shuttle table.
Figure 3:
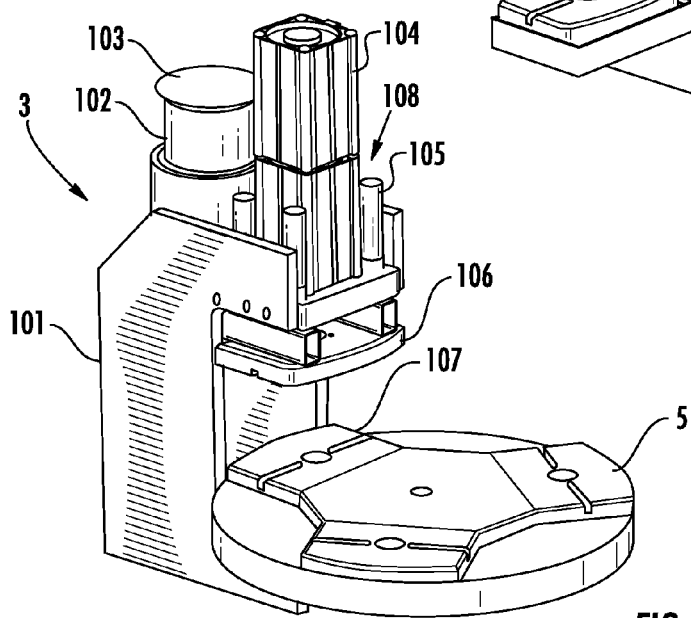
FIG. 3 is substantially a perspective view of one embodiment of the molding apparatus of the present invention having a rotary table.

The present invention comprises a molding apparatus, various embodiments of which are shown in FIGS. 1, 2 and 3 and are generally indicated by reference numbers 1, 2, and 3. FIG. 1 shows an embodiment of the invention utilizing a stationary mold set. FIG. 1 shows a frame 101 onto which various components of the apparatus are attached. Frame 101 is preferably constructed from a strong, rigid material, including metals such as iron, steel, and aluminum. Presently, it is preferred to construct frame 101 from mild steel having a powder coat.

In one embodiment, such as in FIG. 1, the invention is a molding apparatus 1 including a frame 101 and an injection unit 108. The injection unit may contain several parts, including a melt reservoir 102, a melt reservoir extension 103, a pump, a pump motor, and an injection nozzle.

The injection unit is preferably moveably attached to the frame so that it can be moved as desired by the operator, or as determined by a molding program. For example, in FIG. 1, injection unit 108 may be raised or lowered with respect to frame 101. The injection unit may be moved by an actuator 104. During movement, injection unit 108 is raised and lowered on guides 105.

A moveable injection unit is beneficial because it allows increased machine throughput and simplifies automation when used in a shuttle or rotary table design (discussed further below). Prior moveable systems required the use of flexible connections, such as hoses, that are often expensive and/or high maintenance items. The presently disclosed injection unit is advantageous because it provides low maintenance of fixed connection type units with versatility of flexible connection type units.

In this embodiment, the injection unit is preferably in an elevated position on the frame at the beginning of a molding cycle. When a molding cycle is initiated, the injection unit will be lowered until it engages a mold. Hot melt adhesive will then be injected into the mold. After the injection is complete, the injection unit is again brought to an elevated position on the frame, allowing the molded objects to be removed from the mold.

In a presently preferred embodiment, the injection nozzle is permanently engaged in the first half of a mold. The injection unit will be lowered until the first mold half engages a second mold half. Having a permanently engaged injection nozzle may result in lower maintenance because there are less moving parts in the apparatus.

The moveable injection unit preferably may also be moved horizontally in order to engage different mold injection ports, inject into other molds, or accommodate different sized molds. The apparatus may be designed in to inject into the top of a mold or to inject in or near the mold parting line. The apparatus could also be designed to inject into any portion of the mold set, according to the operator's choice.

Those of skill in the art will appreciate that the rotational and translational degrees of freedom of the injection unit can be varied as the needs of the operator require. Indeed, in certain situations it may be desirable to have the injection unit remain in a fixed position. In such a case the injection nozzle itself could move in and out of engagement with a mold.

The injection unit could be configured to inject into the lower half of the mold. The injection unit could be configured to start in a lower position at the beginning of a mold cycle, raise up to engage a mold or mold section, and then lower upon completion of a mold cycle.

Injecting into the top or bottom of a mold may be beneficial because it can reduce the amount of wasted molding material. When injection is in or near the mold parting line, mold material is deposited in the mold-set runners that carry molten molding material to the mold cavity. However, when injection is through the top or bottom of the mold, molding material is injected directly into the mold cavity and so mold-set runners are not needed and no mold material is wasted.

The apparatus also includes mold platens 5 including a first mold platen 106 and a second mold platen 107. In FIG. 1, first mold platen 106 is shown attached to injection unit 108. It will be appreciated that first mold platen 106 may be configured differently, including not being attached to injection unit 108. Mold platens 106 and 107 may be constructed from various materials including metallic substances, plastics, and ceramics. Preferably, mold platens 106 and 107 are made of hard anodized aluminum. The pieces of the mold itself are attached to mold platens 5.

FIG. 2 shows an embodiment of the invention having a shuttle table where second mold platens 107 can be exchanged. Similarly, FIG. 3 shows an embodiment of the invention having a rotary table for exchanging second mold platens 107. It will be appreciated that frame 101, injection unit 108, actuator 104, and guides 105 are preferably identical in FIGS. 1, 2, and 3. The modular design of an embodiment of the invention allows for different configurations of the apparatus using substantially the same components.

Those of skill in the art will appreciate that other embodiments of the present invention are possible. For example, it is possible to have an actuator bring first and second mold platens (or an entire mold set) horizontally into engagement with the apparatus, and then have the injection unit engage the mold. Alternatively, the injection unit could be configured to engage the mold from a direction other than the vertical arrangement shown in FIGS. 1, 2, and 3. In such an arrangement, the location of the mold platens or mold set would be adjusted accordingly. These and other embodiments are within the scope of the present invention and are within the skill of the art worker to carry out.

Melt Reservoir and Cleaning Tool

Figure 4:
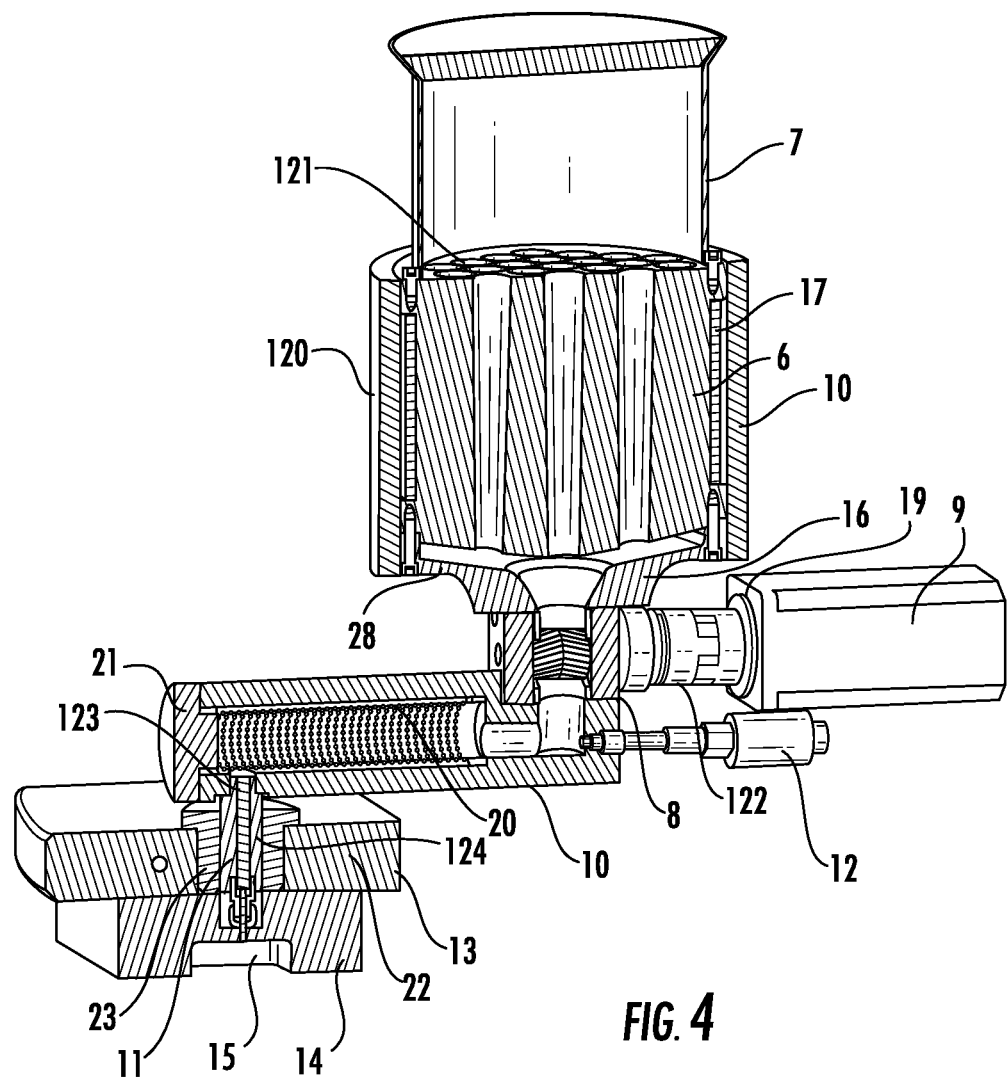
FIG. 4 is substantially a cross sectional view of one embodiment of an injection unit for a molding apparatus of the present invention.

FIG. 4 shows a preferred configuration of an injection unit of the present invention. The injection unit contains a melt reservoir 120 having an outer shell 18 and an insert 6. Melt reservoir 120 is heated by heating element 17. Heating element 17 is not limited to any particular type of heating element, but a band heater, part number MBH00140, available from Tempco of Wood Dale, Ill., is presently preferred. However, other heating units, including cartridge units, could also be used with the present invention.

Melt reservoir 120 is designed to melt and store hot molding material. One of skill in the art will appreciate that various heating elements and melt reservoir designs could be used with the present invention. For example, the melt reservoir disclosed in the '433 application uses fin shaped heating elements to melt the molding material and could be used in the present invention.

In a presently preferred embodiment, melt reservoir 120 contains an extension 7 that extends above the surface of the melt reservoir. Melt reservoir extension 7 is adapted to hold raw, unmelted molding material. This extension is discussed further in connection with an auto feed system that may be used with the present invention.

As shown in FIG. 4, melt reservoir 120 preferably has a sloped bottom 28. Funnel shaped bottom 28 aids in directing molten molding material from melt reservoir 120 through an opening 16 into a pump unit (not shown). The funnel shaped bottom allows for complete drainage of the melt reservoir and aids in cleaning and maintaining the apparatus. The melt reservoir is preferably designed to minimize the amount of ledge space present in the reservoir. Ledges are prone to accumulate material, which can then degrade or char and potentially foul the surface of the melt reservoir.

Melt reservoir 120 and melt reservoir extension 7 can be constructed from a variety of materials, preferably metallic materials. Presently, it is preferred to construct melt reservoir 120 from machined 6065 aluminum. Melt reservoir 120 and melt reservoir 7 may also be of a variety of sizes. Presently, it is preferred for melt reservoir 120 to have a diameter of 150-400 mm and to be 100-300 mm in height.

The melt reservoir may be constructed as one single piece or may be assembled from separate components. For example, the melt reservoir could have an outer shell into which a separate piece containing the tapered cylinders would be inserted. The funnel shaped bottom could also be a separate piece from the rest of the melt reservoir. This arrangement could allow for easier maintenance because it could be disassembled by the operator for cleaning. In addition, piecewise construction would allow different parts of the melt reservoir to be made out of different materials. For instance, it may be beneficial to have the outer shell of the melt reservoir be made of a substance that does not conduct heat well (which may improve operator safety), but have the inner portion of the melt reservoir be made of a highly conductive substance (in order to facilitate melting the molding material). The surfaces of the melt reservoir preferably may also be coated with a nonstick substance, such as Teflon, in order to reduce the amount of charred molding material adhering to the melt reservoir.

A presently preferred melt reservoir contains tapered cylindrical holes 121. The amount of taper can vary, but a 0.5 to 5 degree taper is presently preferred. The reservoir is preferably made of a metallic substance. The metallic substance is preferably aluminum, but could be other materials such as steel or copper. The interior of the melt reservoir is preferably constructed of a substance that will conduct heat, in order to facilitate melting the molding material.

The tapered cylindrical holes in the melt reservoir are used to melt the molding material. The tapered cylindrical holes are advantageous because they provide a relatively large surface area for contact with the molding material. Those of skill in the art will appreciate that the melting process is improved if the objects to be melted have greater contact with the heating elements. The surface area of the presently preferred cylindrical design is approximately twice that of the fin design used in the melt reservoir of the '433 application.

The cylindrical holes have also been found to be desirable because they improve the ease of cleaning the melt reservoir. Hot molding material can char, oxidize or otherwise degrade. The presence of this degraded material can inhibit proper operation of the molding device. Applicants have found that a tapered cleaning tool can be easily inserted into the tapered holes of the melt reservoir. Preferably, the cleaning tool is specifically designed to match the holes in the reservoir, as a non-stick coating helps, but does not prevent, the build-up of charred material. The fit between the tool and the holes of the melt reservoir reduces the amount of force needed to clean the reservoir.

FIG. 5 shows a preferred melt reservoir 6 of the present invention in use with an embodiment of a melt reservoir cleaning tool 25. Melt reservoir cleaning tool 25 preferably has a handle 27, a tapered body 140, and a cleaning mechanism, such as spiral flutes 26. Melt reservoir tool 25 is operated by inserting the tapered body 140 into the tapered cylindrical holes 24 of melt reservoir 6. The operator then rotates cleaning tool 25 by twisting handle 27. Spiral flutes 26 will dislodge and remove charred adhesive and other containments from cylindrical holes 24.

The cleaning tool can be made out of various materials, including ceramics, plastics and various metallic substances. The cleaning tool is preferably made from a material with low heat conductivity, or has a non-conductive coating, in order to prevent the tool from getting hot while it is being used to clean the melt reservoir. Although FIG. 5 shows an embodiment of the cleaning tool having spiral flutes, other designs and cleaning enhancements could be used. For example, the cleaning tool could be fitted with wire bristles to help remove charred material.

In a presently preferred embodiment, the melt reservoir or melt reservoir extension is equipped with a sensor for detecting the level of molding material present in the melt reservoir or melt reservoir extension. The sensor preferably aids the operator in determining when more raw molding material needs to be added to the melt reservoir or melt reservoir extension. The sensor can also be part of an automated process for feeding raw material into the melt reservoir or melt reservoir extension; this is described in more detail below. Maintaining a level of raw, unmelted molding material above the heating elements may aid in preventing the molten and melting molding material from charring, oxidizing, or otherwise degrading.

Molding Materials

Those of skill in the art will appreciate that the apparatus and methods disclosed herein may be used with a variety of molding materials. Preferred molding materials are hot melt adhesives. Presently preferred suitable adhesives include, but are not limited to, dimer acid based polyamide resins such as the MACROMELT® adhesives (MACROMELT is a registered trademark of Henkel Corp.) available from Henkel of Elgin, Ill. Hot melt adhesives are available having a variety of different physical and chemical properties. In addition, additives, such as coloring agents, can be added to the hot melt adhesives.

Hot melt adhesives have advantages over other molding materials. For example, hot melt adhesives can be melted, resolidified, and remelted without losing their ability to be used in the molding process. Other molding materials, epoxy materials for instance, must be used immediately or discarded. In addition, hot melt adhesives are relatively flexible. This flexibility makes hot melt adhesives more suitable for temperature cycling applications than materials such as epoxy, which may shear components off a printed circuit board when subjected to repeated temperature stress. Hot melt adhesives are nontoxic; creating a safer working environment for machine operators.

Preferred hot melt adhesives for use in the present invention preferably have softening points (ball and ring) between 140° C. and 190° C. In a preferred embodiment, the molding process is carried out between 150° C. and 300° C., more preferably between 180° C.-250° C. Those of skill in the art will appreciate that the temperature of the molding process can be adjusted according to the properties of the molding material used.

Molding materials for use in the present invention preferably have a lower viscosity than materials used in high pressure injection molding. Preferred molding materials preferably have viscosities (at 210° C.) between about 1,000 mPas to about 10,000 mPas. Even more preferred are molding materials having viscosities (at 210° C.) between 1,000 mPas and 5,000 mPas.

Pump and Pump Motor

The present invention is preferably configured to allow improved control over the injection pressure applied during the molding process. This improved control is achieved using various design choices including the pump motor, the pump, pressure sensing device, the pump feeding mechanism, and the design of the fluid path from the melt reservoir to the injection nozzle. Pressure control is important in molding because it can affect the appearance and performance of molded items. Pressure control helps ensure that the molded items have a good-looking surface and that the adhesives "pack" properly during molding. Proper packing helps the molded items maintain their structure integrity, particularly in severe environments (for example, high temperature, humidity, or pressure environments).

Shrinkage can occur during the molding process as the molding material changes from liquid to solid phase. Although the amount of shrinkage can vary, 10% shrinkage is fairly typical for hot melt adhesives. Because of shrinkage, it is important to continue to add molten molding material to the mold until the mold is completely filled with solid material. Mold sets have different volumes and shapes, which result in different times being required to complete this "packing cycle." A pressure control system, particularly one with a pressure feedback system, allows the correct amount of molding material to be added to the mold. In addition to the quality of the molded items, the pressure control and feedback system helps optimize the molding cycle time, resulting in improved machine throughput.

With reference again to FIG. 4, molding material is melted in tapered cylindrical holes 121 and directed by funnel shaped bottom 28 through opening 16 and into the gears 8 of a pump 122. Various pumps can be used in the present invention. Presently, gear pumps are preferred for use in the invention.

The gears 8 of pump 122 are preferably in a helical or herring bone design, but other gear designs could be used. Presently, a herringbone design is particularly preferred for the gears 8 of the gear pump. The gears are preferably made of a metallic substance, such as alloy steel. The selection of the gear structure used in the gear pump allows the operator to fine tune the pressure, volume, and pulsation of the fluid molding material. It will be appreciated that it is desirable to accurately control and measure the pressure of the molding material and to control the volume of molding material that is delivered to the injection nozzle. Reducing the fluid pulsation caused by the gear of the gear pump allows more accurate control of both the pressure and volume of the molding material. Reducing pulsation can improve the quality of molded products and can allow more complicated and intricate items to be molded.

The gears 8 of pump 122 are driven by motor 9. Motor 9 is connected to pump 122 through coupling 19. Coupling 19 includes a motor side hub and a pump side hub that are connected via a coupling spider. Suitable couplings and coupling spiders are available from Lovejoy, located in Downers Grove, Ill.

Various motors can be used to drive the pump. For example, stepper motors and servomotors are suitable for use in the invention. In particular, servomotors are presently preferred. It has been found that servomotors allow for more precise control over the volume of the injected material (sometimes called the "shot size"). The "shot size" can be controlled by positioning and/or indexing the servomotor. One suitable servomotor is part number SGMAH-08AF4, available from Yaskawa, of Fremont, Calif. This preferred motor is preferably used in conjunction with the SGDG-10GT drive, also available from Yaskawa.

In a preferred embodiment, the present invention includes a pressure monitoring device, preferably a pressure transducer. As the molten molding material passes through gears 8, the pressure is measured by pressure sensing device 12. Pressure sensing device 12 is not limited to any one type of device, but may preferably be a mely pressure transducer, such as part number 131 0100-0.50T-3, available from Gefran of Winchester, Mass.

In an embodiment that is presently particularly preferred, the mold cavity pressure is controlled via a servo motor. The torque signal from the servo motor provides information about the cavity pressure. When the mold-set cavities are full, the torque from the servo motor will be proportional to the cavity pressure.

The pressure monitoring device is preferably used in conjunction with the servomotor to construct a direct injection pressure feedback loop, allowing very precise measurement and control of the molding conditions. The use of a pressure transducer and/or torque control of a servo motor allows for more accurate determination of the injection pressure than other systems, such as regulating pressure via a fluid bypass valve.

Some prior molding systems use pressure monitoring equipment to measure pressure at various places in the mold-set cavity. If the pressure is correct at these locations, it would be assumed that the molded component was of good quality. However, the monitoring equipment used in this method can be expensive and the data may be somewhat unreliable because the pressure is only measured at certain locations— which may not accurately represent the whole molded component.

The injection control system of the present invention measures the actual volume of molding material injected into the mold. The apparatus can be calibrated for each mold and to take into account any system leaks at the temperature and pressure conditions used in the molding process. The pressure control system of the present invention allows molding material to flow into the mold until the sensor determines that the mold is full. This arrangement also helps ensure that there are no internal vacuum voids in the molded components. The injection control system also preferably is capable of automatically calibrating itself. The injection control system is also preferably capable of generating a signal if the shot size falls outside of a specified range. The signal could be used to generate an alarm, directing the operator to take appropriate corrective action.

In one embodiment of the invention, it is preferred to mold at cavity pressures of between about 5 psig to about 750 psig, even more preferably between about 5 psig to about 500 psig. Through proper selection of molding material, molding conditions, and apparatus design, as discussed above, the injection pressure is preferably controllable to about 3 psi to about 15 psi, preferably to about 3 psi to about 8 psi.

The apparatus of the present invention preferably contains other features to enhance control of the molding conditions. The apparatus is preferably configured to have short distances between the various elements of the apparatus. It has been found that greater pressure control is achieved through a shorter fluid path. Similarly, large orifices are preferably used in the apparatus' construction. Large orifices reduce any possible bottlenecks in the system and, like the shorter distances between parts, decrease the flow resistance and pressure drop in the apparatus.

The location of the various components also may aid in achieving accurate pressure control. For example, in FIG. 4 molten molding material is preferably fed directly from melt reservoir 120 through opening 16 and into gears 8 of pump 122. Additionally, injection nozzle 124 is preferably located below melt reservoir 122 and pump 122. This embodiment allows for a direct fluid path with gravity assisted fluid flow.

Injection Nozzle and Mold Set

The molten molding material is preferably filtered by a filter 20 prior to injection into the mold. Filter 20 can be made of various substances and have various pore sizes. However, filters that are 50 mesh or finer are presently preferred. Filter 20 and pressure sensing device 12 are preferably located in a transition unit 10. Transition unit 10 can be constructed from various substances, including metallic substances. Presently, it is preferred for transition unit 10 to be constructed from 7075 aluminum.

Transition unit 10 is preferably equipped with a cap 21. Cap 21 preferably allows access to the interior of transition unit 10. The operator may desire to access the interior of transition unit 10 in order to perform cleaning or maintenances tasks, such as changing or cleaning filter 20.

The molten adhesive leaves transition unit 10 through port 123. Port 123 directs the molten adhesive into injection nozzle assembly 11. A presently preferred injection nozzle is part number H-200, available from Nordson, located in Atlanta, Ga. Injection nozzle assembly 11 includes injection nozzle 124 and bushing 23. Bushing 23 preferably creates a thermal barrier between relatively hot injection nozzle 124 and relatively cold mold set 14. Insulating bushing 23 is preferably made of an insulating material. Presently, it is preferred for insulating bushing 23 to be made of Teflon. Injection nozzle 124 is preferably made out of metallic substances, such as aluminum. In the embodiment shown in FIG. 4, hot molding material is injected directly from injection nozzle 124 into mold cavity 15.

First mold platen 13 preferably contains cooling channels 22. Cooling channels 22 are preferably used to cool the mold platens and mold set during the molding process. Preferably, water is directed through cooling channels 22. Cooling channels could also be included in the second mold platen, and in the mold set.

Mold set 14 can be constructed from many different types of materials, preferably metallic materials. Mold sets for use in the present invention are preferably made from hard anodized aluminum.

Although the mold set has been generally shown as having two sections, other types of molds having various numbers of components could be used without departing from the scope of the invention. In addition, the injection nozzle may have a plurality of different configurations. For example, the injection nozzle could be permanently engaged in either the first or second mold platen. The injection nozzle could also be permanently engaged into the first or second mold sections.

Actuating Mechanism

The injection unit shown in FIG. 1 can be preferably raised and lowered by means of actuating device 104. Various actuating devices can be used, including electric, hydraulic, or pneumatic systems. A particularly preferred device to move the injection unit, and preferably clamp the mold, is a pneumatic actuator. An embodiment that is presently preferred uses a tandem pneumatic cylinder. The tandem cylinder contains upper and lower pneumatic chambers. The lower chamber is used to move the injection unit and provide clamping force. The upper chamber is preferably used to provide additional clamping force during the molding process.

In the just described embodiment, it is preferable to use a pneumatic servo or proportioning valve to control the airflow into the tandem cylinder. The servo or valve also allows for precise control over the movement of the injection unit. For example, rather than moving the injection unit the entire available distance, the injection unit can be raised and lowered the minimum distance necessary to allow a complete molding cycle to take place. For example, even though the injection unit may be capable of moving twelve inches, only four inches of movement might be required in order to allow an operator to move a mold or molded component after completion of the injection process.

The ability to fine tune the amount of movement is significant to increasing the efficiency, or throughput, of the molding apparatus. Removal of unnecessary movement decreases the molding cycle time, allowing more components to be molded in a given amount of time. Decreased movement may also be beneficial in reducing power consumption and in reducing maintenance costs associated with wear and tear on the apparatus. The ability to fine tune the movement of the injection unit may allow different sized mold sets to be used and allow the molds to be set up in different ways without requiring significant alterations in the apparatus.

Figure 7:
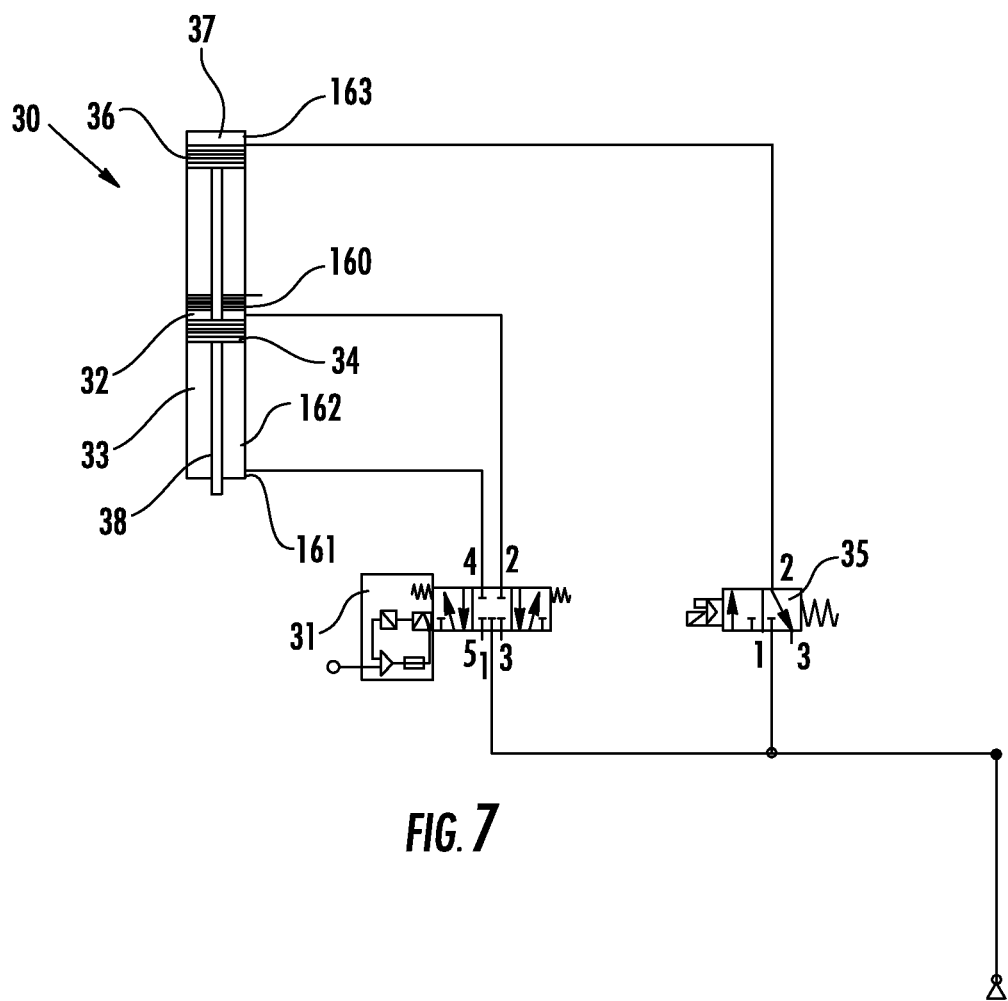
FIG. 7 is substantially a schematic diagram for one embodiment of a tandem pneumatic cylinder for use in an actuator device for a molding apparatus of the present invention.

A schematic of a preferred embodiment of actuating device 104 is shown in FIG. 7. FIG. 7 is a schematic representation of a pneumatic clamping device for use in the present invention. A presently preferred pneumatic device is one having a tandem pneumatic cylinder 30. A presently preferred tandem cylinder is part number DNGUT-125-150-PPV-A, available from Festo, located in Hauppauge, N.Y.

Tandem pneumatic cylinder 30 has a second piston chamber 33 and a first piston chamber 37. First chamber 37 and second chamber 33 contain first piston 36 and second piston 34, respectively.

Air is introduced into second piston chamber 33 through valve 31. Valve 31 is preferably a servo, solenoid, or proportional valve. A servo valve is presently particularly preferred. One suitable solenoid valve is part number CPE24-M1H-30L-318, available from Festo, located in Hauppauge, N.Y. Valve 31 is configured to introduce air through inlets 160 and 161.

Introducing air through inlet 160 into area 32 of second piston chamber 33 will cause second piston 34 to move lower in the chamber. If it is desired to move second piston 34 higher in second piston chamber 33, air can be introduced into area 162 of second piston chamber 33 through inlet 161. Because piston rod 38 is on both sides of second piston 34, the air volume in second piston chamber 33 remains the same even when second piston 34 is traveling up and down. Therefore, second piston 34 can be held at a particular position by applying the same air pressure on both sides of second piston 34. It will be appreciated that second piston 34 can be moved up, down, or held in position by proper application of air pressure through inlets 160 and 161.

First piston 36 is preferably controlled by directional valve 35, which is preferably separate from valve 31. One suitable directional valve is part number MPYE-5-318-010-B, available from Festo, located in Hauppauge, N.Y. First piston 36 is preferably designed to increase the clamping pressure when desired by the operator, and to otherwise travel along with second piston 34. When clamping pressure is required, directional valve 35 maintains air pressure in first piston chamber 37 through inlet 163. When the operator desires to let first piston 36 follow second piston 34, directional valve 35 is directed to bleed air from first piston chamber 37.

Integrated Feed System

Figure 8:
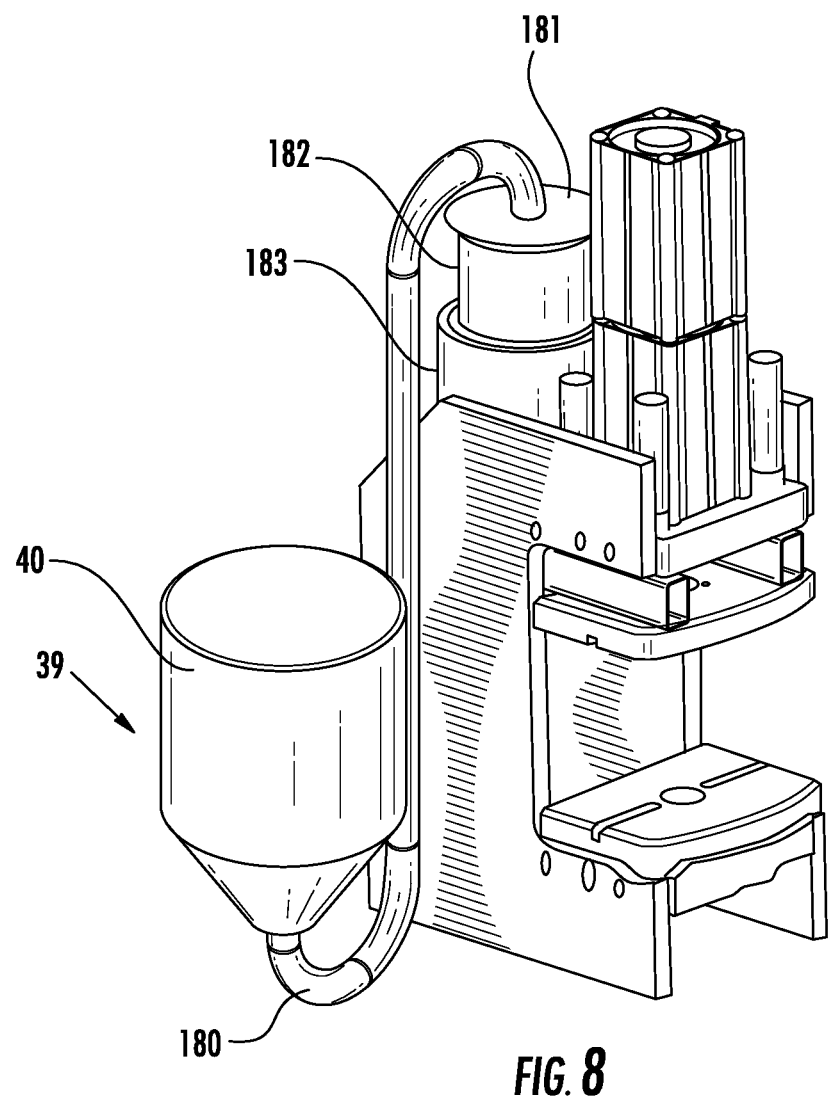
FIG. 8 is substantially a perspective view of one embodiment of an auto feed system in use with one embodiment of a molding apparatus of the present invention.
Figure 9:
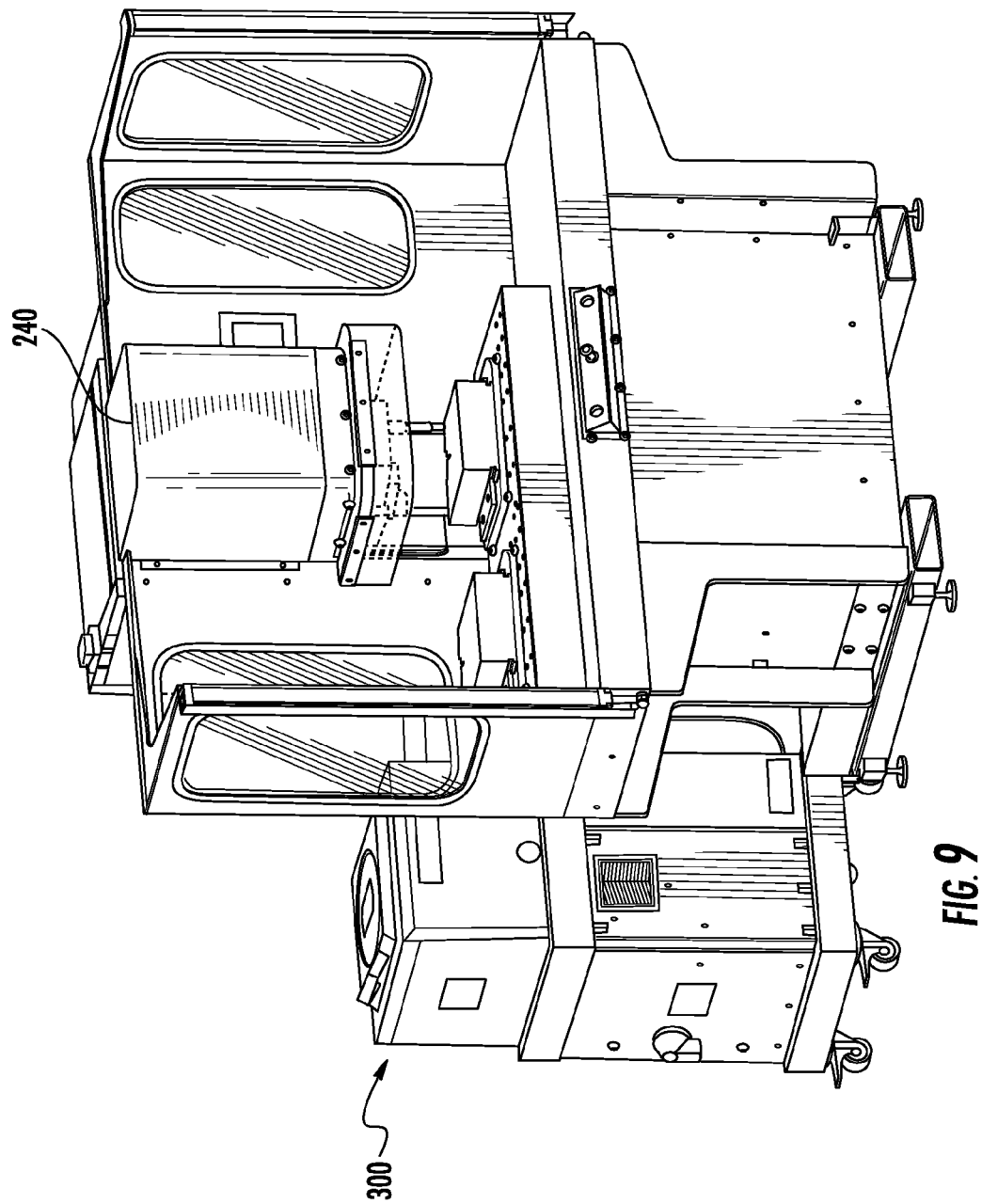
FIG. 9 is substantially an isometric front view of one embodiment of the molding apparatus of the present invention.
Figure 10:
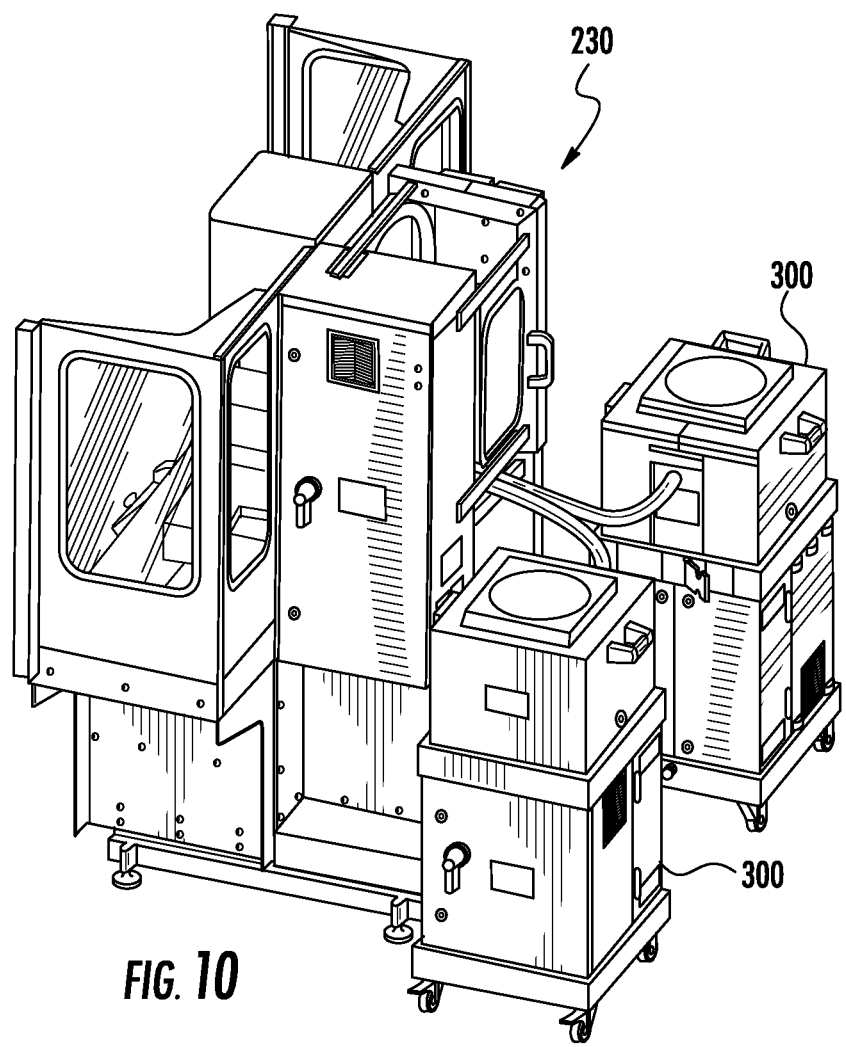
FIG. 10 is substantially an isometric rear elevated view of one embodiment of the molding apparatus of the present invention.
Figure 11:
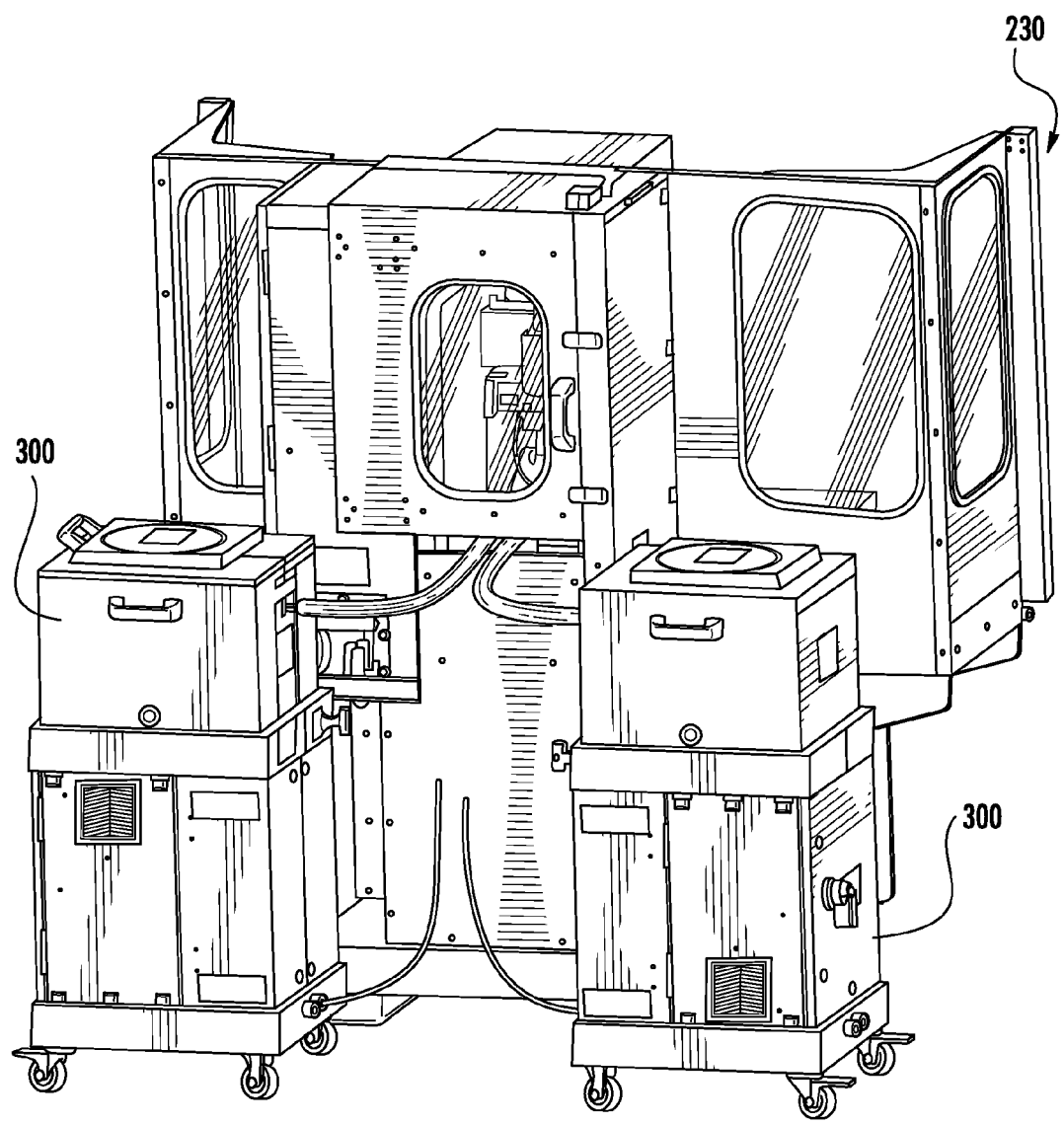
FIG. 11 is substantially an isometric rear view of one embodiment of the molding apparatus of the present invention.
Figure 12:
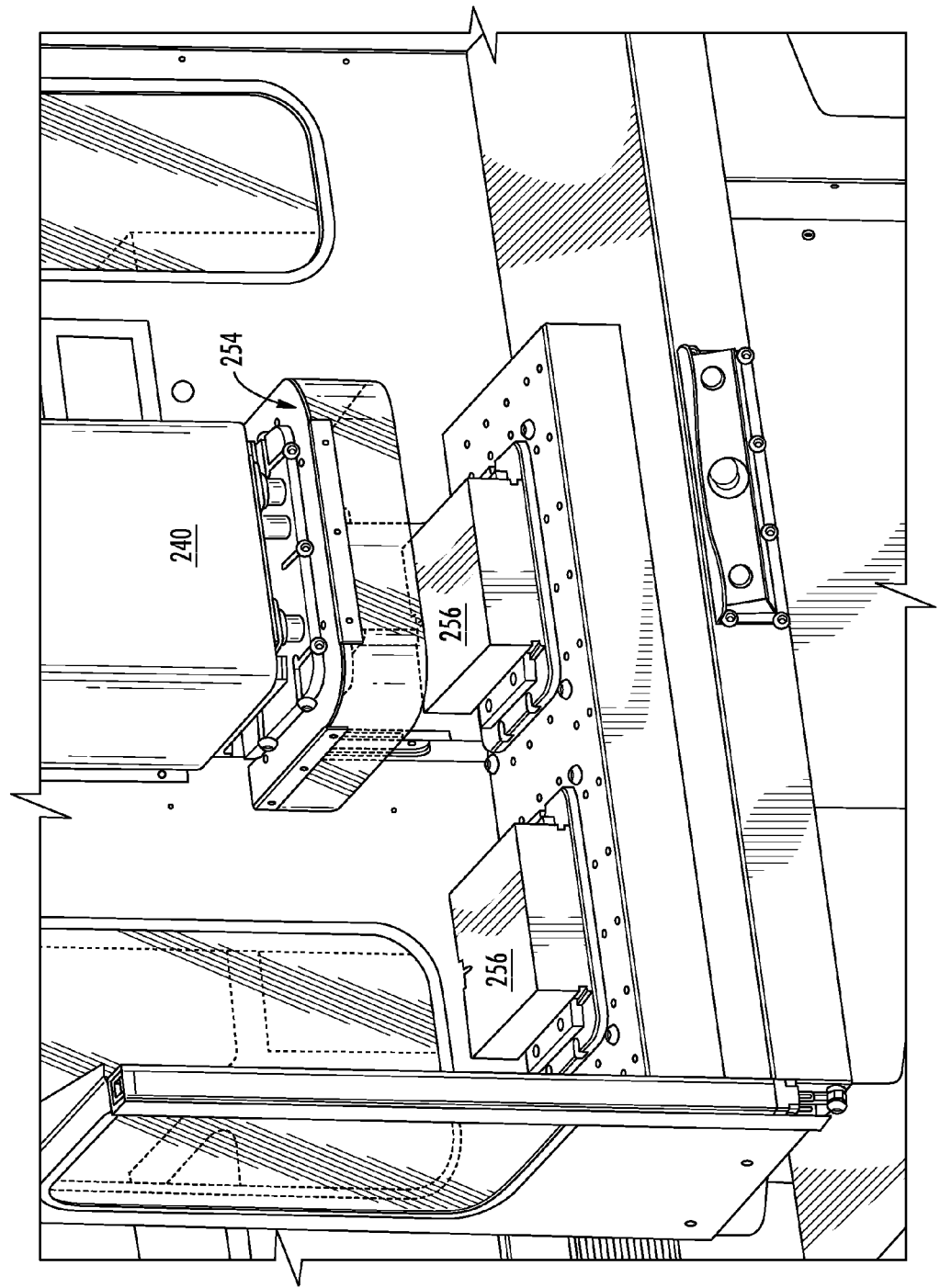
FIG. 12 is substantially an isometric front view of one embodiment of the molding apparatus of the present invention showing the lower molds.

FIG. 8 shows an embodiment of the present invention having an automated feed system 39. Raw molding material is placed in container 40. Container 40 is preferably located away from melt reservoir 183. When additional material is needed in the melt reservoir, material is transferred from container 40 through tube 180 into melt reservoir extension 182. In this embodiment, melt reservoir extension 182 is preferably equipped with a lid 181.

An integrated feed system may reduce charring and degradation of the molding material by providing a cover for the melt unit. Covering the melt unit reduces the amount of air the melting and molten molding material is exposed to. Also, the use of an integrated feed system allows a layer of raw molding material to be consistently maintained on top of the material exposed to the heating elements. This layer of raw material also serves to minimize the amount of charring and degrading of the molding material. Reduced charring and degradation improves the quality and consistency of the molded products and reduces the amount and frequency of necessary maintenance (thereby reducing machine downtime and improving machine throughput and efficiency).

If the raw material is hydroscopic (typically the case for hot melt adhesives), dryers can be included in feed system 39 to remove a portion of the water. The raw material can then be transferred to the melt unit. Removal of water from the hot melt adhesive results in less degradation or charring when the adhesive is melted. Water removal also improves the quality and consistency of the molded components.

Additionally, melt reservoir 183 or melt reservoir extension 182 can preferably be equipped with a sensor to trigger the feed mechanism when the level of molding material falls below a certain point. When the level of raw material drops below a certain level, the sensor will cause the feed system to activate and deliver more raw molding material to the melt reservoir. The sensor helps ensure that the proper level of material is present in the melt reservoir area, helping reduce the amount of oxidation or degradation of the molding material.

An example of an integrated feed unit that could be used with the present invention is the FILLMASTER 1 (FILLMASTER is a trademark of Nordson of Atlanta, Ga.), available from Nordson of Atlanta, Ga. Other automated feed systems could also be used with the present invention.

Controller

The apparatus of the present invention preferably includes a controller, preferably including a computer in communication with various components of the apparatus. The basic functions of the apparatus are preferably controlled by the controller. Components and parameters that are preferably in communication with the controller are, without limitation, the temperature of the melt reservoir, the pump, pump motor, pressure sensor, and actuator. The controller can be preferably programmed with the parameters necessary to carry out a molding cycle on a particular mold set. Once the parameters for the molding process are entered into the controller, the molding apparatus is preferably capable of carrying out the molding process in an automated fashion.

Programs can be entered into the controller in various ways. For example, the operator could enter program parameters directly into the controller though input means such as, but not limited to, a keyboard, keypad, mouse, or touch-screen. The operator could also enter the program parameters at a remote location, such as a computer terminal, and transfer the program through a computer network (such as local area network (LAN) or the internet) to the controller unit. Additionally, programs could be transferred to the controller through portable data storage devices such as, without limitation, computer floppy discs, magnetic tapes, and optical storage means such as DVDs, CR-ROMs, CD-Rs, and CR-RWs.

The programming of suitable computer code, and the selection of proper computer equipment, is within the skill of those in the art. An example of a computer program used to control a somewhat related apparatus is attached as Appendix A. The program of Appendix A is designed for Allan Bradley processors and related components and is preferably downloaded into a computer having an Allan Bradley Micrologix 1500 processor.

Modular Construction of Molding Apparatus

In a presently preferred embodiment, the various molding apparatus components that have been described are produced in a modular form. The modular components are then attached to the frame, and/or each other, to complete the apparatus. The use of modular components is beneficial because it allows for simpler and more efficient manufacturing, design, installation, maintenance, repair, replacement, and reconfiguration of the molding apparatus and molding apparatus components.

For example, the components of the apparatus could be manufactured by different manufacturers, or at different locations, and then shipped to the customer who would easily be able to assemble the complete apparatus. The modular design also increases the flexibility of the apparatus, allowing for replacement of parts in case of equipment redesign and allows flexibility in how the apparatus is configured for use.

In one embodiment, the modular embodiment of the invention allows an operator to assemble a variety of apparatus designs. For example, the apparatus may operate in the stationary design shown in FIG. 1 where a molding cycle is performed, the molded products are removed from the mold, and the mold undergoes additional molding operations. The apparatus could also be operated in a shuttle or rotary table design, illustrated in FIGS. 2 and 3, where new mold platens are automatically brought into engagement with the apparatus. The ability to operate in this manner makes the apparatus of the present invention very easy to operate in an automated manner and further increases the throughput of the machine. Some parts that may be produced in a modular manner are, without limitation, the frame, melt reservoir, injection unit, actuator, controller, and mold platens.

Alternative Embodiment

Figure 13:
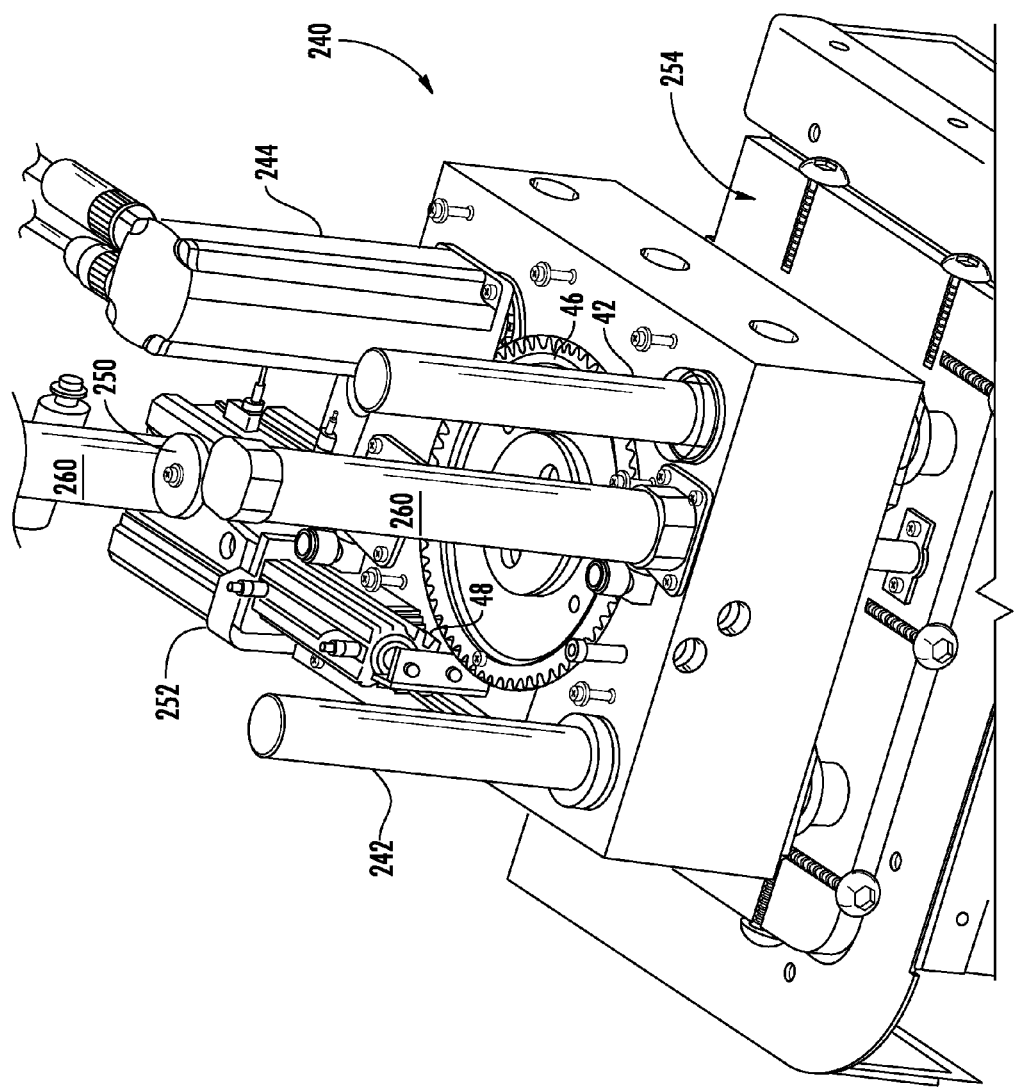
FIG. 13 is substantially an isometric front view of one embodiment of the clamping assembly of the present invention.
Figure 14:
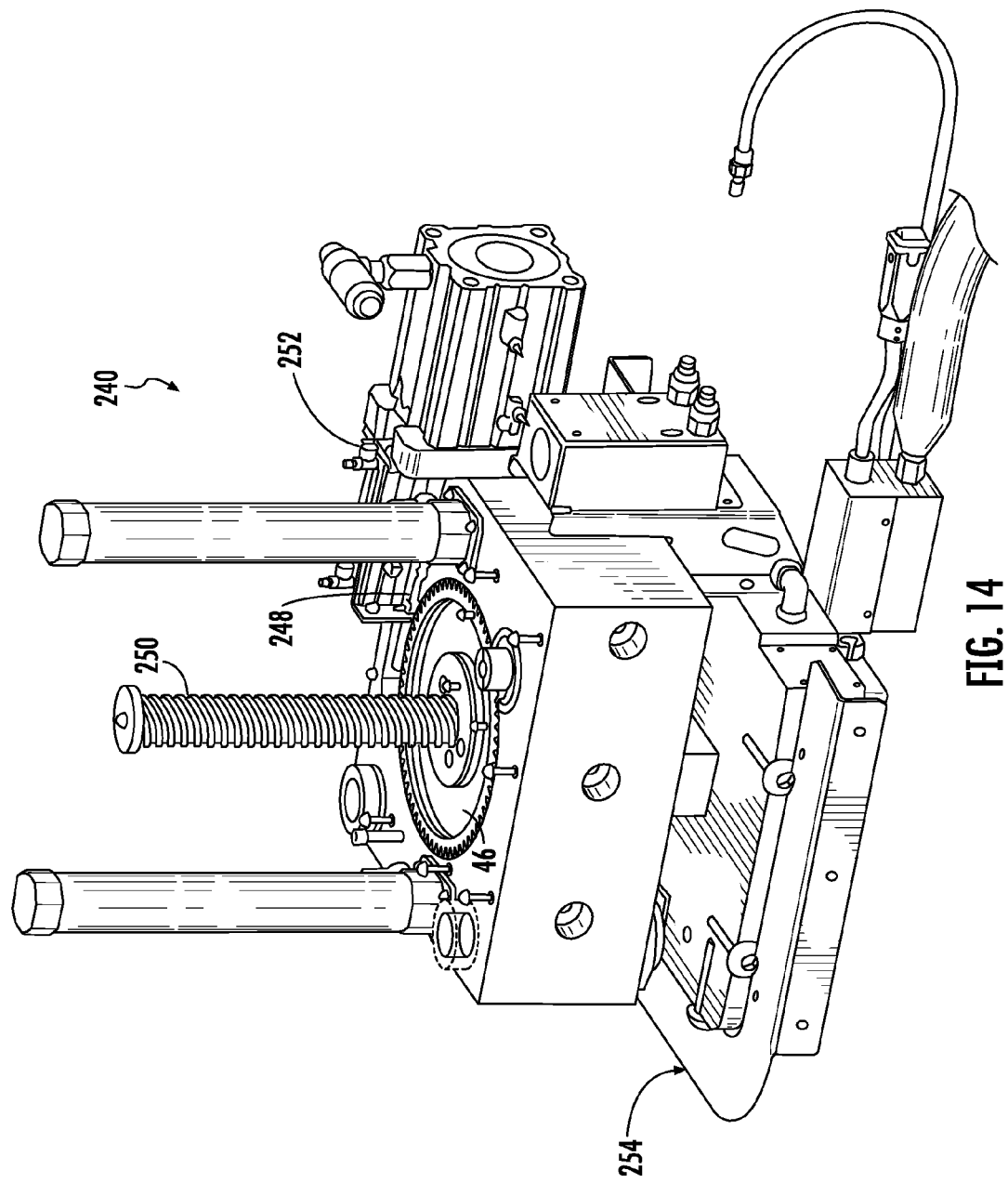
FIG. 14 is substantially an isometric side view of one embodiment of the clamping apparatus of the present invention.
Figure 17:
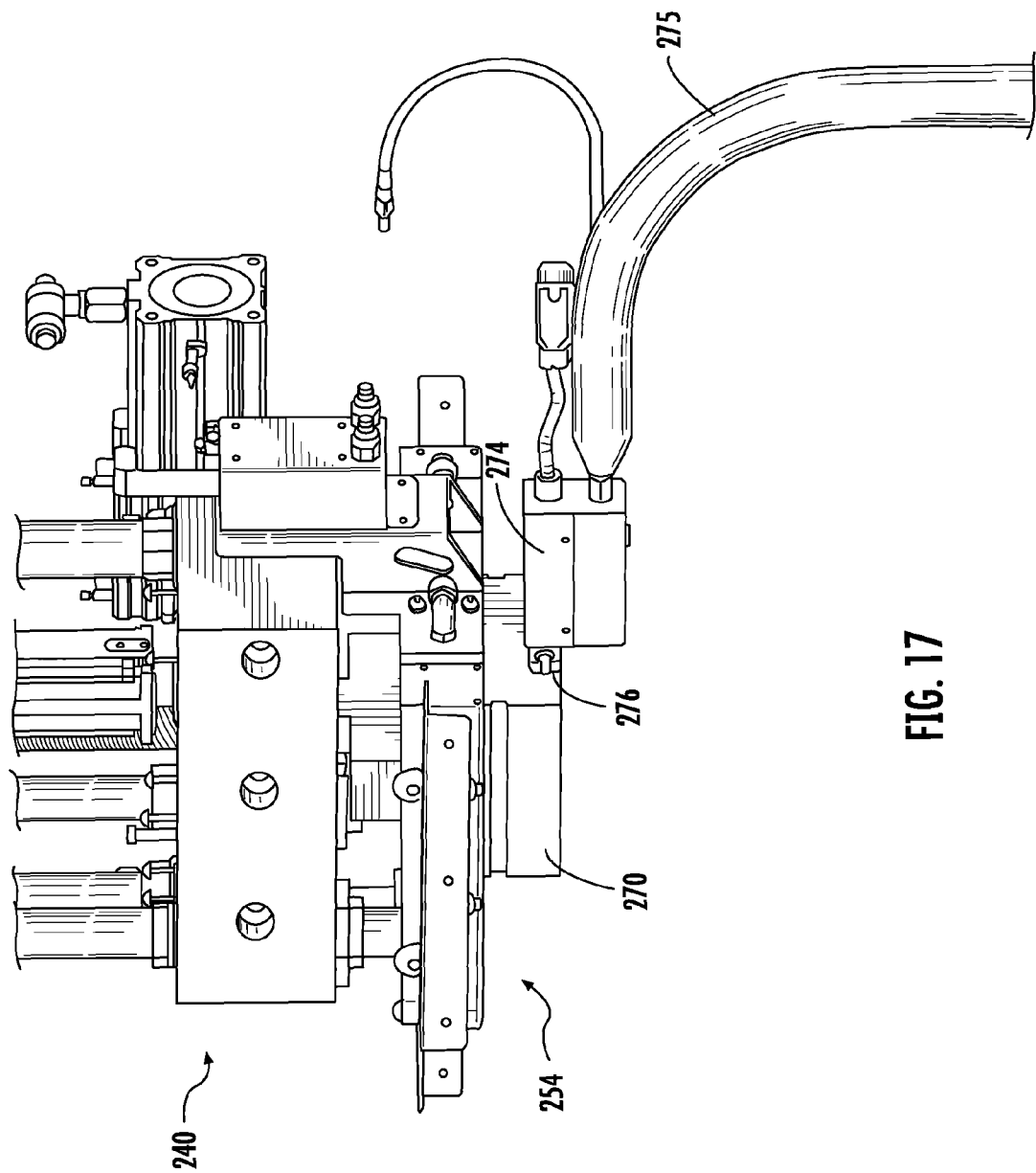
FIG. 17 is substantially an isometric view of one embodiment of the clamping assembly and upper mold portions of the present invention.

As seen in FIGS. 9-12, the present invention comprises a molding apparatus generally indicated by reference number 230. Molding apparatus 230 comprises clamping apparatus 240. As seen in FIGS. 13-15, clamping apparatus 240 comprises guides 242 (hidden in FIG. 14), motor 244, pneumatic actuator 252 and a transmission assembly including circular gear 246, rack gear 248 and threaded shaft 250. Upper mold assembly 254 is attached to guides 242 and threaded shaft 250. Gear 246 is threaded onto threaded shaft 250. Motor 244 is engaged with gear 246 through one or more reduction gears. A controller (not shown) activates motor 244, which in turn rotates gear 246. As gear 246 rotates, threaded shaft 250 moves up or down according to the direction in which motor 244 turns. Upper mold assembly 254 moves in unison with threaded shaft 250. Guides 242 keep the clamping assembly in alignment.

In many molding operations it is necessary to apply a relatively large clamping force to the mold parts so that the mold properly seats and molding material, which is under pressure, does not leak out of the mold cavity. In the present invention, rather than apply the clamping force using only a motor, pneumatic actuator 252, which may comprise a pneumatic cylinder, is used to linearly advance rack gear 248. The teeth on rack gear 248 engage gear 246 and rotate the gear. When gear 246 rotates it imparts a downward force on threaded shaft 250, which imparts a clamping force on the upper mold assembly.

This arrangement provides several advantages. Motor 244 may be smaller and less expensive because it is not required to generate a large clamping force. Less power is consumed because motor 244 is smaller. Motor 244 and associated parts do not wear as quickly because they do not have high static loads. The combination of both motor 244 and the pneumatic actuator allow molding operations to be performed more quickly because motor 244 can quickly raise and lower mold apparatus 240 while pneumatic actuator 252 applies clamping force.

In one embodiment, pneumatic actuator 252 comprises a booster cylinder and a ramp. The ramp provides correct tooth alignment to avoid jams.

Clamping apparatus 240 also comprises counter balance pistons 260. Pistons 260 provide a force which counteracts the weight of the upper mold assembly 254. As seen in FIG. 16, the piston 260 is connected between the upper mold assembly 254 and the frame. As upper mold assembly 254 is lowered, valve 264 is closed and piston 262 moves downward. Since the air in chamber 266 cannot escape, a pressure change is created in the chamber which imparts an upward force on piston 262. This in turn imparts an upward force on upper mold assembly 254. One of the advantages of this arrangement is that less force is required to move upper mold assembly 254 and motor 244 may be smaller and less powerful. In the embodiment depicted, the piston arm moves with the upper mold assembly as the piston housing remains fixed to the frame, however the reverse is also possible. That is, the piston housing may be attached to the moving upper mold assembly while the piston arm is fixed to the frame.

As seen in FIG. 17-20, the present invention also comprises upper mold part 270 and lower mold part 272. Heated supply ends 274, which supply mold material to the mold, may be attached to upper mold part 270 so that they travel up and down with the mold half. Mold material may be supplied to supply ends 275 through flexible insulated hose 275.

Figure 18:
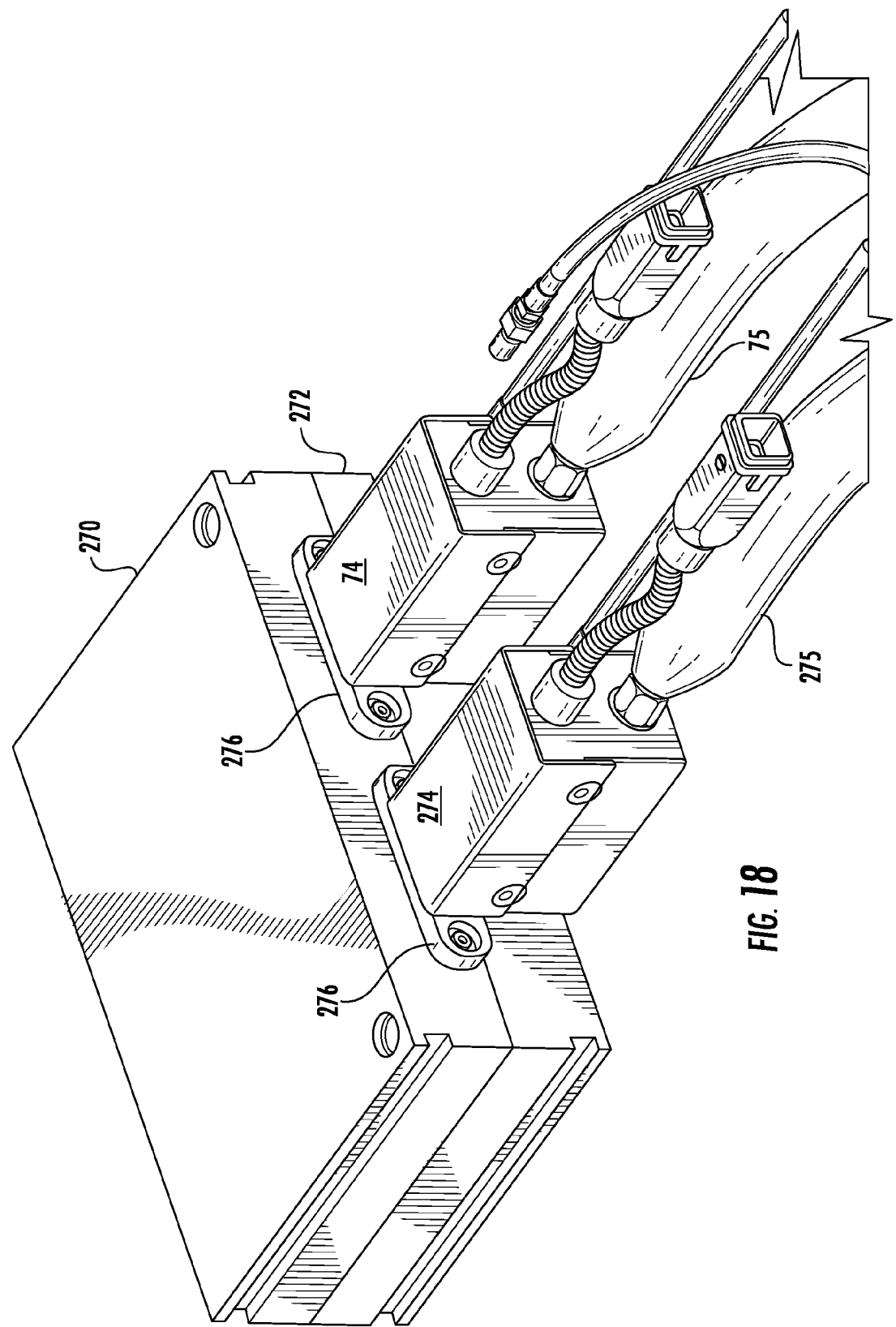
FIG. 18 is substantially an isometric view of one embodiment of the upper and lower mold portions of the present invention.

As seen in FIG. 18, a plurality of supply ends 274 and hoses 275 may be attached to upper mold part 270. Each supply end may be used to inject mold material in to a separate mold cavity and each hose 275 may be connected to a different material module 300. This configuration allows different mold materials to be injected into the mold during the same mold operation.

For example, upper mold part 270 and lower mold part 272 may have a first and second mold cavity. The two mold cavities may be used to cover different parts of the core part and/or the first cavity may be used to cover the core part with a first layer of material and the second cavity may be used to deposit a second layer.

A core part, such as a printed circuit board, is placed in the first mold cavity. The mold parts are then mated and a first mold material with a first set of properties is injected into the first cavity. For example, the first mold material may have a certain color or hardness. After the material is allowed to cool, the mold parts are opened and the part with the first mold material is moved from the first cavity to the second cavity. A new (second) core part may also be placed in the first cavity so that both the first and second cavities may be used simultaneously.

The mold parts are then mated again and a second mold material with a second set of properties is injected into the second cavity. The first mold material may again be simultaneously injected into the first mold cavity to apply the material to the second core part. The second mold material may have a different color and a different hardness than the first mold material. The mold parts are then opened again and the first part, with two different mold materials, is removed from the second cavity. Simultaneously, the second part is moved from the first cavity to the second cavity and a new (third) core part is inserted into the first cavity. The process is repeated as necessary to meet the requirements of a production run.

A greater number of cavities and mold materials may be used in this process. The final part produced will have a combination of materials and properties. The present invention provides for the production of complex molded parts with less handling and mold operations. Prior art molding devices must perform a separate mold operation for each mold material used.

Figure 19:
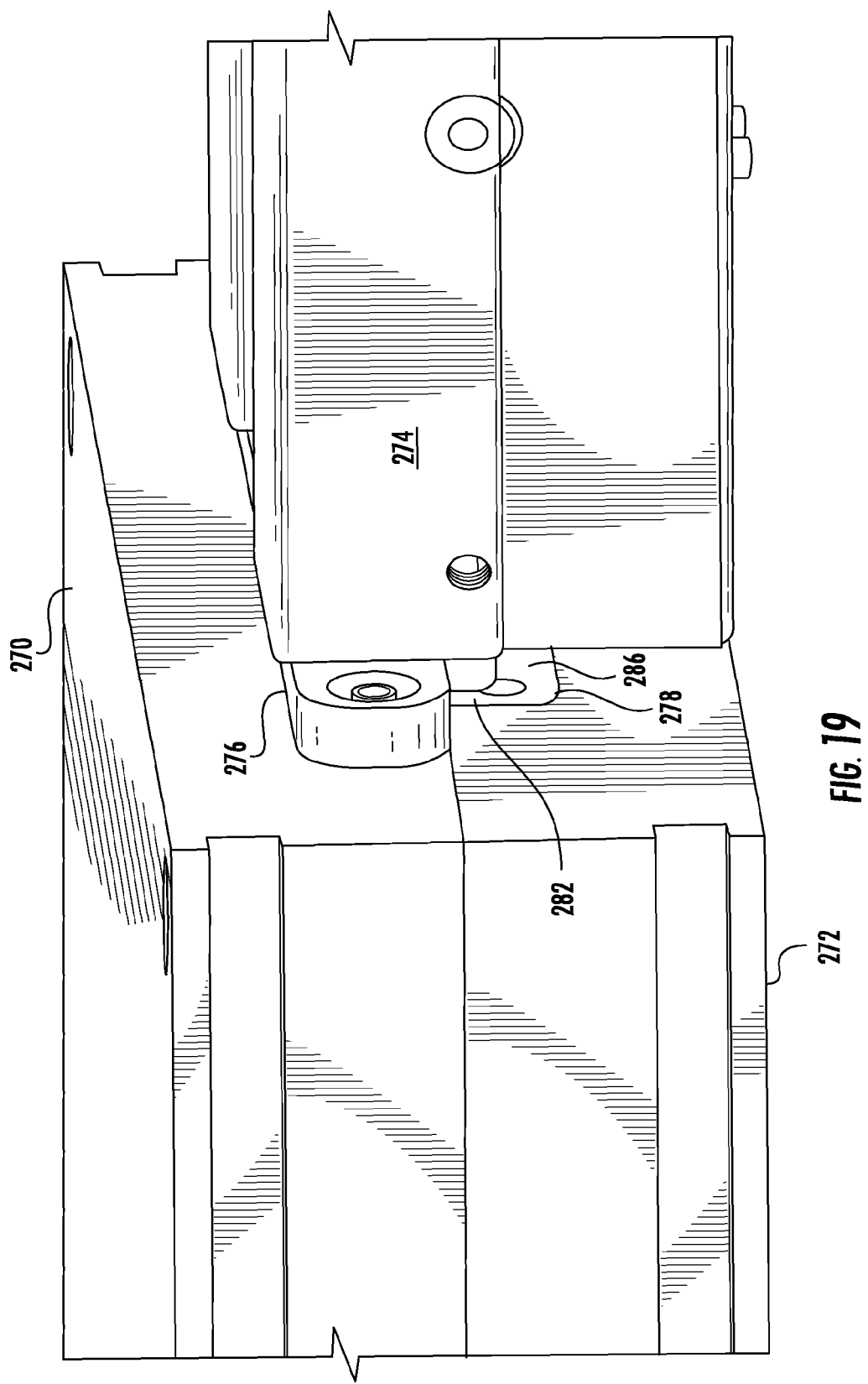
FIG. 19 is substantially an isometric view of one embodiment of the upper and lower mold portions of the present invention.
Figure 20:
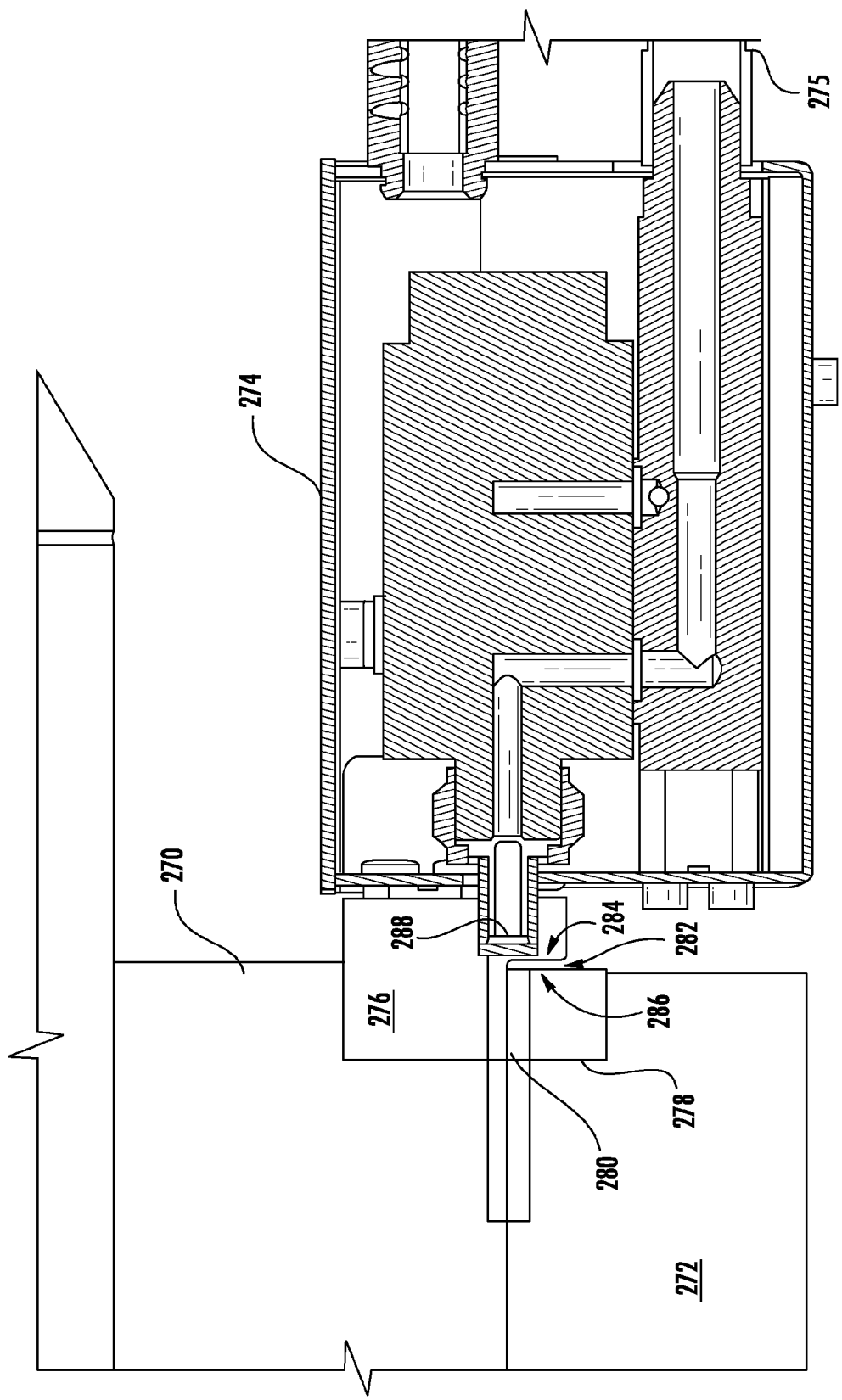
FIG. 20 is substantially a cross sectional view of one embodiment of the upper and lower mold portions of the present invention.

Turning now to FIGS. 19 and 20, an upper nozzle portion 276 is attached to upper mold 270 and to supply end 274. A lower nozzle portion 278 is attached to lower mold 272. Upper nozzle portion 276 and lower nozzle portion 278 together form a channel 280 when the upper mold assembly is brought into an interface engagement with the lower mold assembly, through which mold material is injected into the mold.

In the present invention, a gap 282 is provided between a surface 284 of upper nozzle portion 276 and a surface 286 of lower nozzle portion 278. Upper mold 270 and upper nozzle portion 276 travel up and down with clamping assembly 240. In one embodiment shown in FIGS. 17-20, surfaces 284 and 286 are substantially planar and vertical, however, these surfaces may have other shapes and orientations. Gap 282 prevents surface 284 from rubbing against surface 286 during molding operations. This prevents the two parts from interfering with each other and/or becoming worn. It also reduces the amount of force required to engage the mold parts.

In one embodiment of the present invention gap 282 is 0.05 millimeters, however, larger and smaller gaps may also be used. As mold material begins to be pumped from supply end 275, it crosses gap 282 and enters channel 280. Initially the stream of mold material is under low pressure and it is not forced into gap 282. As soon as mold material crosses gap 282, it begins to cool and form a solid bridge between surfaces 284 and 286. This bridge may be generally cylindrical in shape with a hollow center that allows the liquid mold material to continue to flow into channel 80. When the mold cavity begins to fill and pressure builds up in the stream of mold material, the bridge is thick enough and strong enough to prevent liquid mold material from breaking out and escaping into gap 282. Therefore, no mold material is lost During molding processes, a runner of mold material is formed in channel 280. This runner is residual material from the molding process. The runner may be removed in subsequent cutting and cleaning steps. Prior art molding devices have injection ports in one of the mold portions, not directly in the seam between the mold portions. This causes the injection channel to branch into one of the mold portions. As the runner is formed, it has a branch or spur of material that runs into the mold portion with the injection port. This is disadvantageous because the spur is thicker than the rest of the runner. This increased thickness requires additional time to cool before it can be removed from the mold. This increased cooling time increases the molding cycle time, thereby decreasing the number of parts that can be produced in a given amount of time. The spur also increases the amount of material that is required to make each molded part.

One of the advantages of the present invention is that runners are straight and no spur is produced. Since the injection port is located in a straight line with channel 280, runners are straight with no spurs. This reduces the cooling time, the mold cycle time and amount of mold material used to produce each part.

Figure 21:
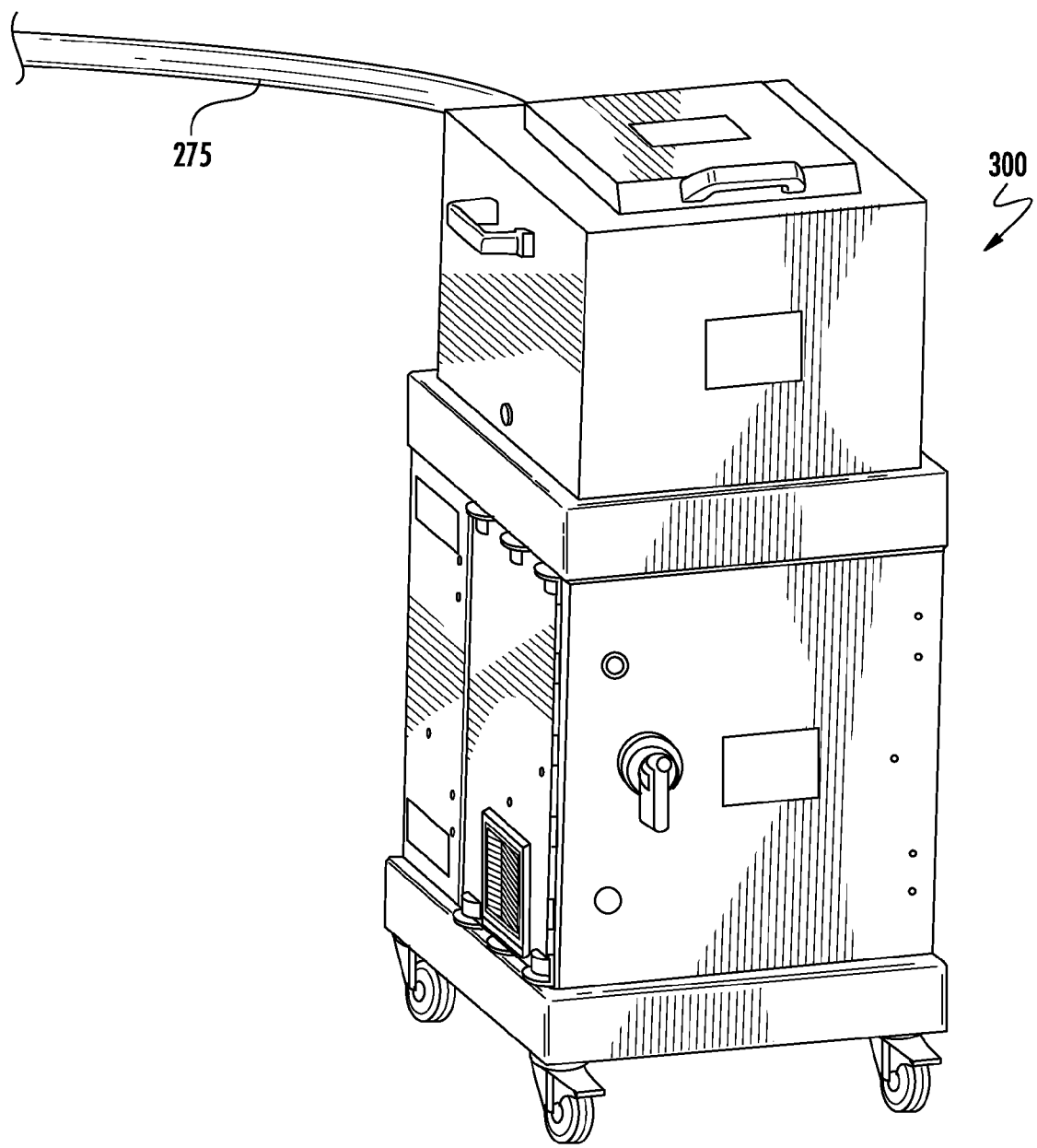
FIG. 21 is substantially an isometric view of one embodiment of the material module of the present invention.
Figure 22:
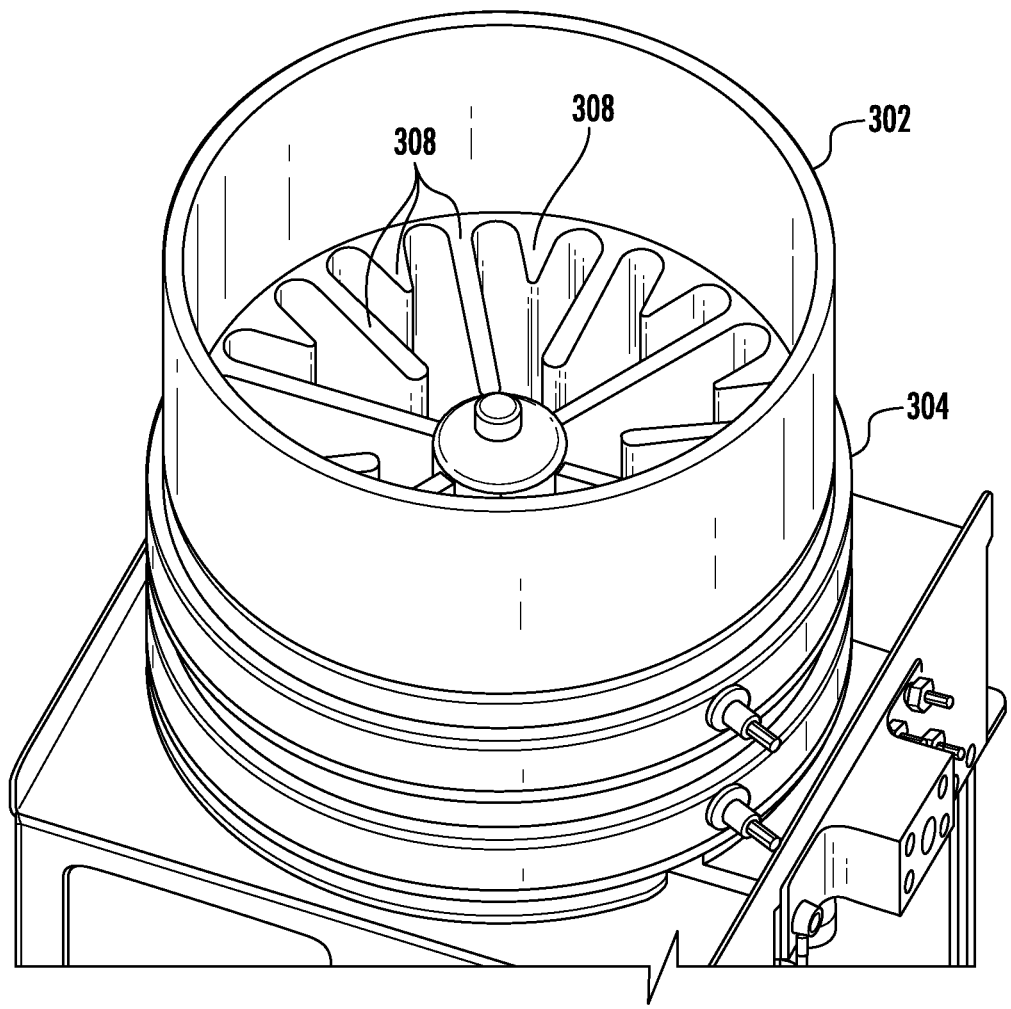
FIG. 22 is substantially an elevated isometric view of one embodiment of the material reservoir of the present invention.
Figure 23:
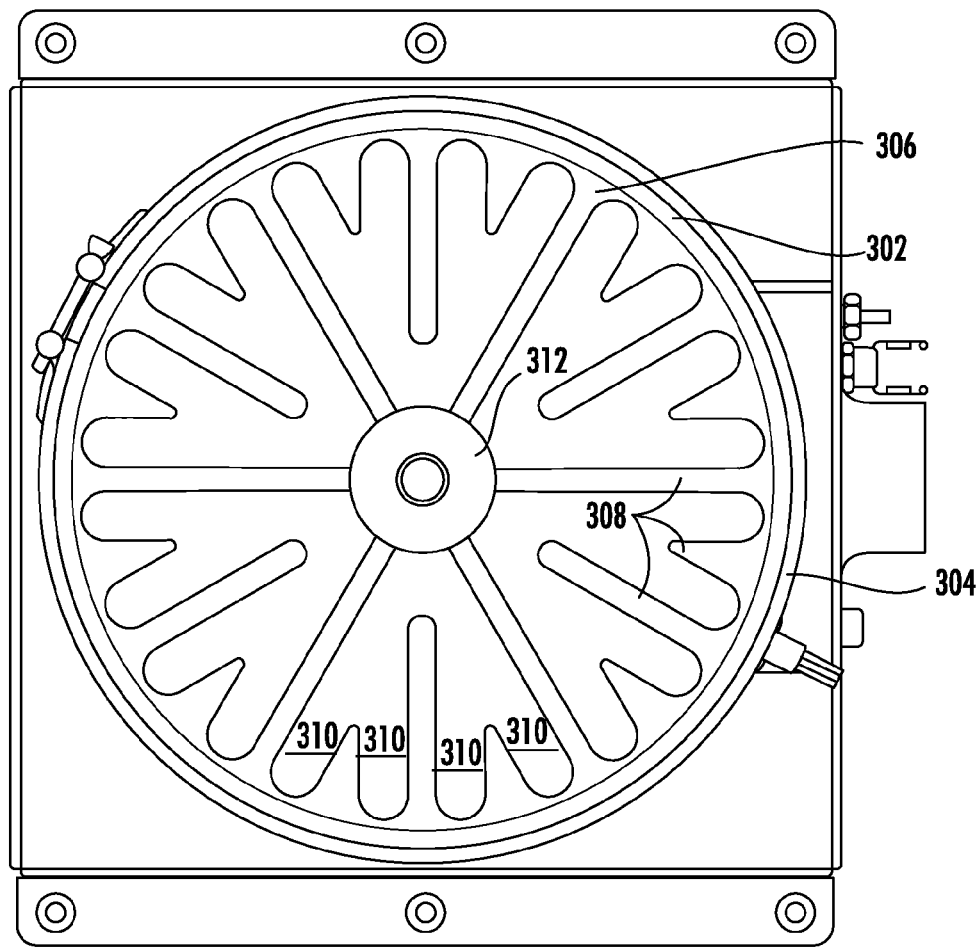
FIG. 23 is substantially a top plan view of one embodiment of the material reservoir of the present invention.

As seen in FIGS. 21-23, the present invention comprises a mold material module 300. Module 300 comprises a heated reservoir 302 that is configured to melt and hold mold material. During normal operation, solid mold material, which may be in the form of pellets or beads, are poured into reservoir 302. Heating elements 304 are activated and the mold material is melted into a liquid state.

One of the problems associated with prior art molding equipment is that melt reservoirs do not uniformly heat mold material. Sharp corners and large gaps between heating surfaces do not uniformly or efficiently transfer heat to the mold material. This can result in pockets of under-heated or over-heated mold material which can in turn result in interruption of mold material to the molds, poor quality or defective molded parts and damage to the molding equipment. Some prior art devices address this issue by providing agitating devices for mixing the reservoir. However, these agitating devices add expense, require additional power and increase maintenance. Other prior art devices use higher heat to ensure that all mold material in the reservoir achieve a minimum temperature. However, higher heat not only uses more energy but it can degrade the mold material thereby causing part defects, waste and inefficient molding operations.

The present invention solves the problems discussed above by providing a high surface area to volume ratio. In the present invention, reservoir 302 comprises heat conductor 306 which is formed from a material with high thermal conductivity, such as aluminum. In one embodiment, conductor 306 is machined from a solid block of material using milling machines and other equipment. In one embodiment, conductor 306 is a separate insert that is slid into reservoir 302 and may be removed for cleaning. In another embodiment, conductor 306 is integrally formed with reservoir 302

Conductor 306 comprises baffles 308 which efficiently conduct heat to the mold material. In one embodiment, baffles 308 are formed so that a plurality of channels 310 is formed in between the baffles. Conductor 306, as shown in the drawings, may have a substantially circular shape, which reduces sharp corners. Some of baffles 308 may extend across the reservoir while other baffles may extend only partially across the reservoir. In the embodiment shown in the drawings, some baffles extend to the center of reservoir 302 in a hub and spoke arrangement. This conducts heat to the central post 312. Central post 312 may be a separate piece that can be lifted out of reservoir.

The configuration of baffles 308 provides a predetermined maximum distance to a heated surface. In other words, there is no position within the reservoir that is greater than the maximum predetermined distance from a heated surface. In one embodiment, the maximum distance is 17 millimeters. In this way, no agitation is required to melt all of mold material and to keep the material at a uniform desired temperature. Furthermore, reservoir 302 may be kept a lower temperature.

In one embodiment, conductor 306 is coated with a non-stick material, such as Teflon. This helps keep mold material from sticking to the surfaces and it makes insert 306 easier to clean. Conductor 306 also comprises mostly vertical surfaces. The vertical surfaces allow mold material to efficiently drain downward and it reduces the amount of material that may stick to the surfaces. In addition, conductor 306 has flat surfaces and large radius corners. The flat surfaces and large radius corners prevent material from sticking and make cleaning easier.

The present invention also comprises inserts (not shown), that may be placed in the cavity formed by conductor 306. Each insert is substantially the same shape as the cavity formed by baffles 308. In some molding operations it may be desirable to melt a smaller amount of mold material. This may be due to a small production run or the type of mold material being used may have a short "pot life" which requires a short retention time in reservoir 302. The present invention allows the mold operator to place the inserts in reservoir 302 thereby reducing the volume available to mold material. This increases the flexibility of reservoir 302.

Figure 24:
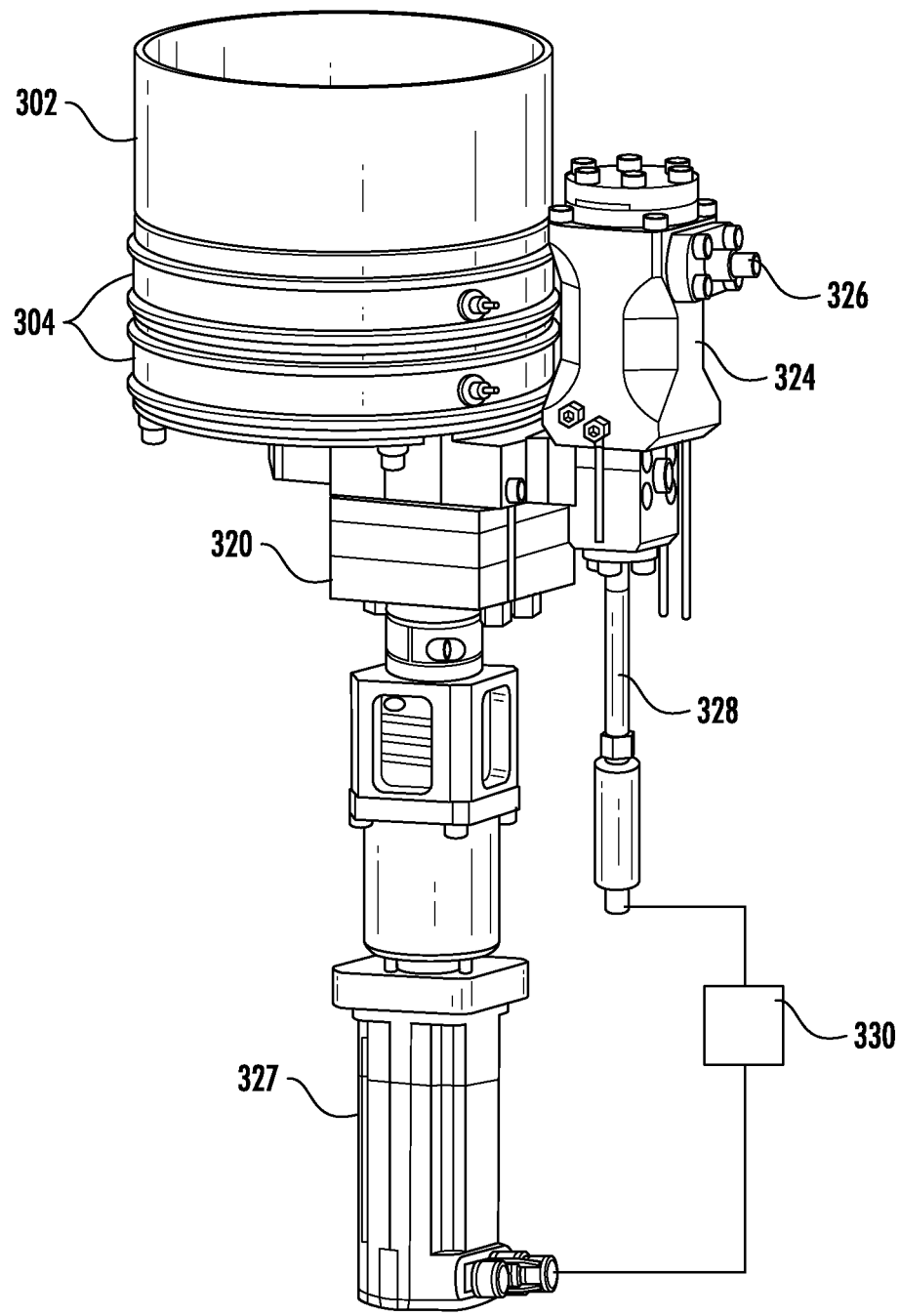
FIG. 24 is substantially a side isometric view of one embodiment of the material reservoir and pump system of the present invention.

As seen in FIG. 24, reservoir 302 is attached to a pump 320 which is driven by motor 322. In one embodiment, pump 320 is a gear pump; many different types of pumps may also be used. Pump 320 pumps liquid mold material from the bottom of reservoir 302 to filter assembly 324. Filter assembly 324 comprises a removable filter that is configured to remove any debris from the mold material. Insulated hose 275 (not shown in FIG. 24) is attached to filter assembly 324 at port 326 for transporting the mold material to the molds.

A pressure transducer or sensor 328 is in fluid communication with the stream of mold material, downstream from pump 320. Controller 330 is in communication with both sensor 328 and motor 322. Controller 330 is a programmable controller that is configured to sense the pressure of the stream of mold material. In addition, controller 330 controls the pressure of the stream by controlling motor 322. For example, when mold material has filled a mold cavity, pressure can quickly build up in the mold material supply stream. Such pressure pikes can cause damage to the mold equipment and result in defective products. Controller 330 can be programmed so that pump 320 is stopped or slowed when a mold cavity is full or close to being filled during a molding cycle. This prevents over-pressurization of the system.

The present invention provides much more accurate pressure control and requires fewer parts than prior art systems that use other pressure systems, such as flow bypass loops, thereby reducing cost and maintenance requirements. In addition, controller 330 is capable of recording, analyzing and communicating data for statistical process control. Controller 330 may be connected to a large variety of sensors and parts.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A molding apparatus comprising:
   a frame;
   a mold assembly having a first mold and a second mold, the second mold coupled to the frame;
   a transmission assembly coupled to the frame and to the first mold;
   a motor coupled to the transmission assembly for moving the first mold relative to the second mold; and
   a pneumatic actuator coupled to the transmission assembly for increasing clamping pressure between the first mold and the second mold;
   wherein the first mold comprises a first nozzle portion defining a first channel portion and the second mold comprises a second nozzle portion defining a second channel portion, and wherein the first channel portion and the second channel portion together form a channel when the first mold is brought into interface engagement with the second mold, wherein mold material may be injected into the mold assembly through the channel;
   wherein the first nozzle portion is connected to a source of mold material; and
   wherein the first nozzle portion comprises a first surface and the second nozzle portion comprises a second surface substantially planar and parallel to the first surface, and wherein, when the first mold is in interface engagement with the second mold, there is a gap between the first surface and the second surface.

2. The molding apparatus of claim 1 wherein the transmission assembly comprises:
   a threaded shaft coupled to the first mold;

a gear in threaded engagement with the threaded shaft such that rotation of the gear causes the first mold to move relative to the second mold;

wherein the motor is coupled to the gear such that the motor can cause the gear to rotate; and wherein the pneumatic actuator is coupled to the gear such that actuation of the pneumatic actuator causes the gear to rotate.

3. The molding apparatus of claim 2, wherein the gear comprises outer teeth and wherein the outer teeth are engaged by the motor and the pneumatic actuator.

4. The molding apparatus of claim 2, wherein the gear comprises a central thread that engages the threaded shaft.

5. The molding apparatus of claim 1, additionally comprising one or more guides that maintain alignment of the first mold and the second mold during relative movement therebetween.

6. The molding apparatus of claim 5, wherein at least one guide comprises a shaft that extends through an aperture in the first mold.

7. The molding apparatus of claim 1, additionally comprising at least one counterbalance assembly that counterbalances the weight of the first mold.

8. The molding apparatus of claim 7, wherein the at least one counterbalance assembly comprises at least one piston operatively connected between the first mold and the frame, the piston being located within a chamber, wherein downward movement of the first mold moves the piston within the chamber, creating a change in pressure in the chamber such that the changed pressure provides an upward force on the piston and the first mold.

9. The molding apparatus of claim 1, wherein the first nozzle portion and the second nozzle portion are is configured such that when mold material from the source of mold material is supplied to the channel, the mold material crosses the gap.

10. A molding apparatus comprising:
    a frame;
    a first mold;
    a second mold coupled to the frame means;
    a transmission configured to move the first mold relative to the second mold;
    a motor configured to actuate the transmission; and
    a pneumatic actuator configured to actuate the transmission;
    wherein the first mold includes a first nozzle portion defining a first channel portion and the second mold comprises a second nozzle portion defining a second channel portion, and wherein the first channel portion and the second channel portion together form a channel when the first mold engages the second mold, wherein the first mold and the second mold are configured such that mold material may be injected through the channel;

wherein the first nozzle portion comprises a first surface and the second nozzle portion comprises a second surface substantially planar and parallel to the first surface, and wherein, when the first mold engages the second mold, there is a gap between the first surface and the second surface.

* * * * *